(12) United States Patent
Lam et al.

(10) Patent No.: US 9,203,116 B2
(45) Date of Patent: Dec. 1, 2015

(54) ENERGY STORAGE DEVICE

(75) Inventors: Lan Trieu Lam, Springvale (AU); Jun Furukawa, Iwaki (JP)

(73) Assignees: COMMONWEALTH SCIENTIFIC AND INDUSTRIAL RESEARCH ORGANISATION, Campbell (AU); FURUKAWA BATTERY CO., LTD., Yokahama (JP)

( * ) Notice: Subject to any disclaimer, the term of this patent is extended or adjusted under 35 U.S.C. 154(b) by 1295 days.

(21) Appl. No.: 12/518,521

(22) PCT Filed: Dec. 12, 2007

(86) PCT No.: PCT/AU2007/001916
§ 371 (c)(1),
(2), (4) Date: Apr. 13, 2010

(87) PCT Pub. No.: WO2008/070914
PCT Pub. Date: Jun. 19, 2008

(65) Prior Publication Data
US 2010/0203362 A1    Aug. 12, 2010

(30) Foreign Application Priority Data

Dec. 12, 2006 (AU) .............................. 2006906932

(51) Int. Cl.
*H01M 12/02* (2006.01)
*H01M 4/36* (2006.01)
(Continued)

(52) U.S. Cl.
CPC ........... *H01M 10/4235* (2013.01); *H01G 11/04* (2013.01); *H01G 11/12* (2013.01);
(Continued)

(58) Field of Classification Search
CPC ........... H01M 4/56; H01M 4/73; H01M 4/62; H01M 4/028; H01M 10/06; H01M 10/08; H01M 10/4235; H01M 12/005; H01M 2004/021

USPC .......................... 429/209, 225, 228, 211, 233
See application file for complete search history.

(56) References Cited

U.S. PATENT DOCUMENTS

| 2,938,063 | A | 5/1960 | Greenburg et al. |
| 4,215,190 | A | 7/1980 | Ferrando et al. |

(Continued)

FOREIGN PATENT DOCUMENTS

| CN | 1357899 A | 7/2002 |
| CN | 101414691 A | 4/2009 |

(Continued)

OTHER PUBLICATIONS

International Search Report of PCT/AU2004/001262, mailed Nov. 8, 2004.

(Continued)

*Primary Examiner* — Kenneth Douyette
(74) *Attorney, Agent, or Firm* — Nixon & Vanderhye P.C.

(57) ABSTRACT

An energy storage device comprising at least one negative electrode, wherein each negative electrode is individually selected from (i) an electrode comprising negative battery electrode material; (ii) an electrode comprising capacitor electrode material; (iii) a mixed electrode comprising either—a mixture of battery and capacitor electrode material or—a region of battery electrode material and a region of capacitor electrode material, or—a combination thereof, and wherein the energy storage device either comprises at least one electrode of type (iii), or comprises at least one electrode of each of types (i) and (ii),—at least one positive electrode, wherein the positive electrode comprises positive battery electrode material and a charging ability-increasing additive, such as one or a mixture of: (a) carbon nanomaterial, vapor grown carbon fiber, fullerene, or a mixture thereof, and (b) tin dioxide conductive materials.

16 Claims, 19 Drawing Sheets

(51) Int. Cl.
*H01M 4/56* (2006.01)
*H01M 10/42* (2006.01)
*H01M 4/62* (2006.01)
*H01M 4/73* (2006.01)
*H01M 10/06* (2006.01)
*H01M 10/08* (2006.01)
*H01M 12/00* (2006.01)
*H01G 11/04* (2013.01)
*H01G 11/12* (2013.01)
*H01G 11/22* (2013.01)
*H01G 11/32* (2013.01)
*H01G 11/46* (2013.01)
*H01M 4/02* (2006.01)

(52) U.S. Cl.
CPC .............. *H01G 11/22* (2013.01); *H01G 11/32* (2013.01); *H01G 11/46* (2013.01); *H01M 4/56* (2013.01); *H01M 4/62* (2013.01); *H01M 4/73* (2013.01); *H01M 10/06* (2013.01); *H01M 10/08* (2013.01); *H01M 12/005* (2013.01); *H01M 2004/021* (2013.01); *H01M 2004/028* (2013.01); *Y02E 60/126* (2013.01); *Y02E 60/13* (2013.01); *Y02T 10/7016* (2013.01); *Y02T 10/7022* (2013.01)

(56) References Cited

U.S. PATENT DOCUMENTS

| | | | |
|---|---|---|---|
| 4,422,987 A | | 12/1983 | Arimatsu |
| 4,507,372 A | * | 3/1985 | Rowlette ............... 429/228 |
| 4,567,284 A | | 1/1986 | Monzyk et al. |
| 4,576,879 A | | 3/1986 | Nakazawa et al. |
| 4,770,954 A | | 9/1988 | Noordenbos |
| 4,882,132 A | | 11/1989 | Monzyk et al. |
| 4,975,253 A | | 12/1990 | Monzyk et al. |
| 5,069,990 A | | 12/1991 | Yoshimura et al. |
| 5,077,151 A | | 12/1991 | Yasuda et al. |
| 5,154,989 A | | 10/1992 | Howard et al. |
| 5,252,105 A | | 10/1993 | Witherspoon et al. |
| 5,260,855 A | | 11/1993 | Kaschmitter et al. |
| 5,384,685 A | | 1/1995 | Tong et al. |
| 5,419,977 A | | 5/1995 | Weiss et al. |
| 5,429,893 A | | 7/1995 | Thomas |
| 5,439,756 A | | 8/1995 | Anani et al. |
| 5,455,999 A | | 10/1995 | Weiss et al. |
| 5,458,043 A | | 10/1995 | Jensen et al. |
| 5,464,453 A | | 11/1995 | Tong et al. |
| 5,491,399 A | | 2/1996 | Gregory et al. |
| 5,518,833 A | | 5/1996 | Repplinger et al. |
| 5,526,223 A | | 6/1996 | Wu et al. |
| 5,529,971 A | | 6/1996 | Kaschmitter et al. |
| 5,534,369 A | | 7/1996 | Nagaura |
| 5,547,783 A | | 8/1996 | Funato et al. |
| 5,574,353 A | | 11/1996 | Bai et al. |
| 5,587,250 A | | 12/1996 | Thomas et al. |
| 5,604,426 A | | 2/1997 | Okamura et al. |
| 5,626,729 A | | 5/1997 | Thompson et al. |
| 5,670,266 A | | 9/1997 | Thomas et al. |
| 5,705,259 A | | 1/1998 | Mrotek et al. |
| 5,744,258 A | * | 4/1998 | Bai et al. ............... 429/3 |
| 5,781,403 A | | 7/1998 | Aoki et al. |
| 5,789,338 A | | 8/1998 | Kaschmitter et al. |
| 5,821,006 A | | 10/1998 | Patel et al. |
| 5,821,007 A | | 10/1998 | Harshe et al. |
| 5,849,426 A | | 12/1998 | Thomas et al. |
| 5,916,699 A | | 6/1999 | Thomas et al. |
| 5,935,724 A | | 8/1999 | Spillman et al. |
| 5,935,728 A | | 8/1999 | Spillman et al. |
| 5,960,898 A | | 10/1999 | Okada et al. |
| 5,993,983 A | | 11/1999 | Rozon |
| 6,005,764 A | | 12/1999 | Anderson et al. |
| 6,011,379 A | | 1/2000 | Singh et al. |
| 6,072,691 A | | 6/2000 | Suhara et al. |
| 6,087,812 A | | 7/2000 | Thomas et al. |
| 6,088,217 A | | 7/2000 | Patel et al. |
| 6,117,585 A | | 9/2000 | Anani et al. |
| 6,190,805 B1 | | 2/2001 | Takeuchi et al. |
| 6,195,252 B1 | | 2/2001 | Belyakov et al. |
| 6,208,502 B1 | | 3/2001 | Hudis et al. |
| 6,208,878 B1 | | 3/2001 | Hattori et al. |
| 6,222,723 B1 | | 4/2001 | Razoumov et al. |
| 6,252,762 B1 | | 6/2001 | Amatucci |
| 6,294,893 B1 | | 9/2001 | De Abreu |
| 6,304,467 B1 | | 10/2001 | Nebrigic |
| 6,310,789 B1 | | 10/2001 | Nebrigic et al. |
| 6,316,563 B2 | | 11/2001 | Naijo et al. |
| 6,331,365 B1 | | 12/2001 | King |
| 6,333,123 B1 | | 12/2001 | Davis et al. |
| 6,466,429 B1 | | 10/2002 | Volfkovich et al. |
| 6,509,116 B1 | | 1/2003 | Kaneko et al. |
| 6,509,713 B2 | | 1/2003 | De Abreu |
| 6,517,972 B1 | | 2/2003 | Amatucci |
| 6,541,140 B1 | | 4/2003 | Spillman et al. |
| 6,576,365 B1 | | 6/2003 | Meitav et al. |
| 6,585,915 B2 | | 7/2003 | Shinozaki et al. |
| 6,610,440 B1 | | 8/2003 | LaFollette et al. |
| 6,623,884 B1 | | 9/2003 | Spillman et al. |
| 6,628,504 B2 | | 9/2003 | Volfkovich et al. |
| 6,631,073 B1 | | 10/2003 | Sakata et al. |
| 6,643,151 B1 | | 11/2003 | Nebrigic et al. |
| 6,646,415 B1 | | 11/2003 | Nebrigic et al. |
| 6,653,014 B2 | | 11/2003 | Anderson et al. |
| 6,680,600 B2 | | 1/2004 | Emori et al. |
| 6,687,116 B2 | | 2/2004 | Hudis |
| 6,706,079 B1 | | 3/2004 | Shmatko et al. |
| 6,737,822 B2 | | 5/2004 | King |
| 6,749,963 B2 | | 6/2004 | Kurosaki et al. |
| 6,765,363 B2 | | 7/2004 | LaFollette et al. |
| 6,869,731 B2 | | 3/2005 | Nobuta et al. |
| 6,887,617 B2 | | 5/2005 | Sato et al. |
| 6,911,273 B2 | | 6/2005 | Faris |
| 7,006,346 B2 | | 2/2006 | Volfkovich et al. |
| 7,035,084 B2 | | 4/2006 | Kaneko et al. |
| 7,049,792 B2 | | 5/2006 | King |
| 7,057,880 B2 | | 6/2006 | Kurosaki et al. |
| 7,074,688 B2 | | 7/2006 | Kurihara et al. |
| 7,083,876 B2 | | 8/2006 | Honbo et al. |
| 7,110,242 B2 | | 9/2006 | Adrianov et al. |
| 7,119,047 B1 | | 10/2006 | Adrianov et al. |
| 7,144,654 B2 | | 12/2006 | LaFollette et al. |
| 7,166,384 B2 | | 1/2007 | LaFollette et al. |
| 7,186,473 B2 | | 3/2007 | Shiue et al. |
| 7,358,008 B2 | | 4/2008 | Nanno et al. |
| 7,397,650 B2 | | 7/2008 | Sato et al. |
| 7,420,295 B2 | | 9/2008 | Omae et al. |
| 7,462,419 B2 | | 12/2008 | LaFollette et al. |
| 7,468,221 B2 | | 12/2008 | LaFollette et al. |
| 7,649,335 B2 | | 1/2010 | Ishikawa et al. |
| 7,742,279 B2 | | 6/2010 | Takahashi et al. |
| 7,862,931 B2 | | 1/2011 | Furukawa et al. |
| 7,923,151 B2 | | 4/2011 | Lam et al. |
| 8,017,273 B2 | | 9/2011 | Lara-Curzio et al. |
| 8,057,937 B2 | | 11/2011 | Sung et al. |
| 2001/0011119 A1 | | 8/2001 | Naijo et al. |
| 2001/0033501 A1 | | 10/2001 | Nebrigic |
| 2001/0044045 A1 | | 11/2001 | Sato et al. |
| 2002/0036478 A1 | | 3/2002 | De Abreu |
| 2002/0037452 A1 | | 3/2002 | Schmidt |
| 2002/0058185 A1 | | 5/2002 | Kurosaki et al. |
| 2002/0096661 A1 | | 7/2002 | Shinozaki et al. |
| 2002/0132164 A1 | | 9/2002 | Kaneko et al. |
| 2002/0155327 A1 | | 10/2002 | Faris |
| 2002/0158606 A1 | | 10/2002 | King |
| 2002/0161146 A1 | | 10/2002 | Naijo et al. |
| 2002/0163771 A1 | | 11/2002 | Volfkovich et al. |
| 2002/0176221 A1 | | 11/2002 | Hudis |
| 2002/0182485 A1 | | 12/2002 | Anderson et al. |
| 2002/0196597 A1 | | 12/2002 | Volfkovich et al. |
| 2003/0006737 A1 | | 1/2003 | LaFollette et al. |
| 2003/0007317 A1 | | 1/2003 | Hudis |
| 2003/0008212 A1 | | 1/2003 | Akashi et al. |
| 2003/0011964 A1 | | 1/2003 | Hudis |

(56) References Cited

U.S. PATENT DOCUMENTS

| | | |
|---|---|---|
| 2003/0035982 A1 | 2/2003 | Ryu et al. |
| 2003/0049528 A1 | 3/2003 | Honbo |
| 2003/0070916 A1 | 4/2003 | Nanno et al. |
| 2003/0091905 A1 | 5/2003 | Nobuta et al. |
| 2003/0094923 A1 | 5/2003 | Emori et al. |
| 2003/0129458 A1 | 7/2003 | Bailey |
| 2003/0152815 A1 | 8/2003 | LaFollette et al. |
| 2003/0188901 A1 | 10/2003 | Ovshinsky et al. |
| 2003/0219653 A1 | 11/2003 | Kelley et al. |
| 2003/0232238 A1 | 12/2003 | Fleming et al. |
| 2004/0009161 A1 | 1/2004 | Escary |
| 2004/0018421 A1 | 1/2004 | LaFollette et al. |
| 2004/0038087 A1 | 2/2004 | Shiue et al. |
| 2004/0053124 A1 | 3/2004 | LaFollette et al. |
| 2004/0057194 A1 | 3/2004 | Hudis |
| 2004/0091777 A1* | 5/2004 | Lam et al. .................... 429/225 |
| 2004/0112486 A1 | 6/2004 | Aust et al. |
| 2004/0121204 A1 | 6/2004 | Adelman et al. |
| 2004/0141282 A1 | 7/2004 | Hudis |
| 2004/0142243 A1 | 7/2004 | Furukawa et al. |
| 2004/0161640 A1 | 8/2004 | Salot |
| 2004/0189226 A1 | 9/2004 | King |
| 2004/0209165 A1 | 10/2004 | Kurosaki et al. |
| 2004/0246658 A1 | 12/2004 | Adrianov et al. |
| 2005/0002150 A1 | 1/2005 | Volfkovich et al. |
| 2005/0081350 A1 | 4/2005 | Kurihara et al. |
| 2005/0089728 A1 | 4/2005 | Arai et al. |
| 2005/0093380 A1 | 5/2005 | LaFollette et al. |
| 2005/0110457 A1 | 5/2005 | LaFollette et al. |
| 2005/0112420 A1 | 5/2005 | Lai et al. |
| 2005/0147885 A1 | 7/2005 | Sato et al. |
| 2005/0170242 A1 | 8/2005 | Sato et al. |
| 2005/0221191 A1 | 10/2005 | Kondo et al. |
| 2005/0253458 A1 | 11/2005 | Omae et al. |
| 2005/0260497 A1 | 11/2005 | Kumashiro et al. |
| 2006/0038536 A1 | 2/2006 | LaFollette et al. |
| 2006/0115732 A1 | 6/2006 | Zaghib et al. |
| 2006/0172196 A1 | 8/2006 | Fukunaga et al. |
| 2006/0223701 A1 | 10/2006 | Adrianov et al. |
| 2006/0269801 A1 | 11/2006 | Honbo et al. |
| 2007/0104981 A1 | 5/2007 | Lam et al. |
| 2007/0128472 A1 | 6/2007 | Tierney et al. |
| 2007/0247787 A1 | 10/2007 | Nakagawa et al. |
| 2008/0197810 A1 | 8/2008 | Ishikawa et al. |
| 2008/0199737 A1 | 8/2008 | Kazaryan et al. |
| 2008/0206638 A1 | 8/2008 | Takahashi et al. |
| 2008/0264291 A1 | 10/2008 | Pike et al. |
| 2008/0318135 A1 | 12/2008 | Sung et al. |
| 2009/0059474 A1 | 3/2009 | Zhamu et al. |
| 2009/0272946 A1 | 11/2009 | Lu |
| 2009/0291360 A1 | 11/2009 | Kim et al. |
| 2010/0015531 A1 | 1/2010 | Dickinson et al. |
| 2010/0075210 A1 | 3/2010 | Lee et al. |
| 2010/0175934 A1 | 7/2010 | Lam et al. |
| 2010/0214722 A1 | 8/2010 | Fujii et al. |
| 2011/0151286 A1 | 6/2011 | Lam et al. |
| 2011/0177392 A1 | 7/2011 | Hoshiba |
| 2012/0094174 A1 | 4/2012 | Furukawa et al. |
| 2012/0244429 A1 | 9/2012 | Lam et al. |
| 2012/0258336 A1 | 10/2012 | Jun et al. |
| 2012/0263977 A1 | 10/2012 | Furukawa et al. |
| 2014/0127565 A1 | 5/2014 | Furukawa et al. |

FOREIGN PATENT DOCUMENTS

| | | |
|---|---|---|
| EP | 0 354 966 B1 | 1/1989 |
| EP | 0 354 966 A1 | 7/1989 |
| EP | 0 555 422 B1 | 2/1992 |
| EP | 0 662 726 A2 | 12/1994 |
| EP | 0 662 726 A3 | 12/1994 |
| EP | 0 801 834 B1 | 4/1996 |
| EP | 0 934 607 B1 | 9/1997 |
| EP | 0 964 416 A1 | 11/1997 |
| EP | 0 851 445 A2 | 12/1997 |
| EP | 0 851 445 B1 | 12/1997 |
| EP | 0 872 908 A1 | 4/1998 |
| EP | 0 872 908 B1 | 4/1998 |
| EP | 0 893 790 A2 | 7/1998 |
| EP | 0 893 790 B1 | 7/1998 |
| EP | 1 115 130 A1 | 8/1999 |
| EP | 1 000 796 A2 | 11/1999 |
| EP | 1 190 480 B1 | 6/2000 |
| EP | 1 071 148 A2 | 7/2000 |
| EP | 1 071 148 B1 | 7/2000 |
| EP | 1 126 536 A2 | 2/2001 |
| EP | 1 126 536 B1 | 2/2001 |
| EP | 1 179 871 A2 | 8/2001 |
| EP | 1 189 295 A2 | 9/2001 |
| EP | 1 189 295 B1 | 9/2001 |
| EP | 1 251 576 A2 | 4/2002 |
| EP | 1 315 227 A2 | 4/2002 |
| EP | 1 391 961 A1 | 8/2002 |
| EP | 1 391 961 B1 | 8/2002 |
| EP | 1 309 028 A2 | 10/2002 |
| EP | 1 309 028 B1 | 10/2002 |
| EP | 1 418 428 A1 | 11/2002 |
| EP | 1 496 556 A1 | 4/2003 |
| EP | 1 496 556 B1 | 4/2003 |
| EP | 1 541 422 A1 | 7/2003 |
| EP | 1 775 786 A1 | 7/2003 |
| EP | 1 561 105 B1 | 11/2003 |
| EP | 1 783 792 A1 | 7/2004 |
| EP | 1 386 336 B1 | 1/2006 |
| EP | 2 184 796 A1 | 7/2007 |
| FR | 2692077 | 12/1993 |
| JP | S59-105266 | 6/1984 |
| JP | 61-283173 | 12/1986 |
| JP | 62-103976 | 5/1987 |
| JP | 03-129667 | 6/1991 |
| JP | 04 043557 A | 2/1992 |
| JP | 4061214 | 2/1992 |
| JP | 4-233170 | 8/1992 |
| JP | 4-294515 | 10/1992 |
| JP | H06-128317 | 5/1994 |
| JP | 09-092272 | 4/1997 |
| JP | 10 021900 A | 1/1998 |
| JP | 10-50565 | 2/1998 |
| JP | 10-294135 | 11/1998 |
| JP | 11-97319 | 4/1999 |
| JP | 11-224699 | 8/1999 |
| JP | 2000-1595 | 1/2000 |
| JP | 2000-13915 | 1/2000 |
| JP | 2000-21408 | 1/2000 |
| JP | 2000-77076 | 3/2000 |
| JP | 2000-235858 | 8/2000 |
| JP | 2001-110418 | 4/2001 |
| JP | 2001-126757 | 5/2001 |
| JP | 2001-313237 | 11/2001 |
| JP | 2001-319655 | 11/2001 |
| JP | 2001-332264 | 11/2001 |
| JP | 2001-351688 | 12/2001 |
| JP | 2002-47372 | 2/2002 |
| JP | 2002-50543 | 2/2002 |
| JP | 2002-50544 | 2/2002 |
| JP | 2002-75788 | 3/2002 |
| JP | 2002-118036 | 4/2002 |
| JP | 2002-298853 | 10/2002 |
| JP | 2002-367613 | 12/2002 |
| JP | 2003-51306 | 2/2003 |
| JP | 2003-51306 A | 2/2003 |
| JP | 2003-77458 | 3/2003 |
| JP | 2003-87988 | 3/2003 |
| JP | 2003-132941 | 5/2003 |
| JP | 2003-200739 | 7/2003 |
| JP | 2003-308696 | 10/2003 |
| JP | 2004-047613 A2 | 2/2004 |
| JP | 2004-55240 | 2/2004 |
| JP | 2004-55541 | 2/2004 |
| JP | 2004-134369 | 4/2004 |
| JP | 2004-221523 | 8/2004 |
| JP | 2004-273443 | 9/2004 |
| JP | 2004-355823 | 12/2004 |
| JP | 2005-32938 | 2/2005 |

(56) References Cited

FOREIGN PATENT DOCUMENTS

| | | |
|---|---|---|
| JP | 2005-050582 | 2/2005 |
| JP | 2005-80470 | 3/2005 |
| JP | 2005-160271 | 6/2005 |
| JP | 2005-183632 | 7/2005 |
| JP | 2005-248653 | 9/2005 |
| JP | 2005-294497 | 10/2005 |
| JP | 2005-327489 | 11/2005 |
| JP | 2005-353652 | 12/2005 |
| JP | 2006-156002 | 6/2006 |
| JP | 2006-252902 | 9/2006 |
| JP | 2006-310628 | 11/2006 |
| JP | 2006-325331 | 11/2006 |
| JP | 2007-12596 | 1/2007 |
| JP | 2007-506230 | 3/2007 |
| JP | 2007-226996 | 9/2007 |
| JP | 2007-280803 | 10/2007 |
| JP | 2008-22605 | 1/2008 |
| JP | 2008-047452 A2 | 2/2008 |
| JP | 2008-146898 A2 | 6/2008 |
| JP | 2008-150270 | 7/2008 |
| JP | 2008-171766 | 7/2008 |
| JP | 2009-104827 | 5/2009 |
| JP | 2009-135056 | 6/2009 |
| JP | 2009-219960 | 10/2009 |
| TW | I268005 | 12/2006 |
| WO | WO89/06865 A1 | 7/1989 |
| WO | WO92/11174 A1 | 7/1992 |
| WO | WO93/05541 A1 | 3/1993 |
| WO | WO93/14511 A1 | 7/1993 |
| WO | WO94/07272 A1 | 3/1994 |
| WO | WO95/21466 | 8/1995 |
| WO | WO95/23437 A1 | 8/1995 |
| WO | WO96/11522 | 4/1996 |
| WO | WO 96/12313 | 4/1996 |
| WO | WO96/17361 | 6/1996 |
| WO | WO96/30959 | 10/1996 |
| WO | WO97/12415 | 4/1997 |
| WO | WO98/08266 | 2/1998 |
| WO | WO98/19357 | 5/1998 |
| WO | WO98/24100 | 6/1998 |
| WO | WO98/40925 | 9/1998 |
| WO | WO98/40926 A1 | 9/1998 |
| WO | WO98/54816 | 12/1998 |
| WO | WO99/24996 | 5/1999 |
| WO | WO00/02213 | 1/2000 |
| WO | WO00/11688 | 3/2000 |
| WO | WO00/63929 | 10/2000 |
| WO | WO01/01553 A1 | 1/2001 |
| WO | WO01/17054 A1 | 3/2001 |
| WO | WO01/41232 A2 | 6/2001 |
| WO | WO01/95410 A1 | 12/2001 |
| WO | WO02/01655 A2 | 1/2002 |
| WO | WO02/052664 A2 | 7/2002 |
| WO | WO02/087006 | 10/2002 |
| WO | WO02/091412 A1 | 11/2002 |
| WO | WO02/099956 A2 | 12/2002 |
| WO | WO03/036670 A2 | 5/2003 |
| WO | WO03/055791 A2 | 7/2003 |
| WO | WO03/077333 A1 | 9/2003 |
| WO | WO03/088385 A1 | 10/2003 |
| WO | WO03/094184 A1 | 11/2003 |
| WO | WO03/098648 A1 | 11/2003 |
| WO | WO2004/008560 A2 | 1/2004 |
| WO | WO2004/012964 A1 | 2/2004 |
| WO | WO2004/038051 A1 | 5/2004 |
| WO | WO2004/042394 A2 | 5/2004 |
| WO | WO 2005/027255 | 3/2005 |
| WO | WO2005/027255 A1 | 3/2005 |
| WO | WO2005/041343 A1 | 5/2005 |
| WO | WO2006/006218 A1 | 1/2006 |
| WO | WO2006/062349 A1 | 6/2006 |
| WO | WO 2006/109909 | 10/2006 |
| WO | WO2006/109909 A1 | 10/2006 |
| WO | WO2006/132052 A2 | 12/2006 |
| WO | WO2007/017506 A1 | 2/2007 |
| WO | WO 2007/034873 | 3/2007 |
| WO | WO 2007/050466 | 5/2007 |
| WO | WO2007/058421 A1 | 5/2007 |
| WO | WO2007/097534 A1 | 8/2007 |
| WO | WO2008/016236 A1 | 2/2008 |
| WO | WO 2008/051885 | 5/2008 |
| WO | WO2008/070914 A1 | 6/2008 |
| WO | WO2008/101190 A1 | 8/2008 |
| WO | WO2008/113133 A1 | 9/2008 |
| WO | WO2009/013796 A1 | 1/2009 |
| WO | WO2009/041180 A1 | 4/2009 |
| WO | WO2009/071292 A1 | 6/2009 |
| WO | WO 2009/005170 | 8/2009 |
| WO | WO2009/094931 A1 | 8/2009 |
| WO | WO2009/101047 A1 | 8/2009 |
| WO | WO2009/128482 A1 | 10/2009 |
| WO | WO 2010/122873 A1 | 10/2010 |

OTHER PUBLICATIONS

Examiner's Report No. 2 on Australian Patent Appln. No. 2004273104 dated Sep. 21, 2009.
Lam et al, "Development of ultra-battery for hybrid-electric vehicle applications", Journal of Power Sources 158 (2006) 1140-1140.
Russian Patent Application No. 2012111222—Office Action (English translation included), mailed Aug. 27, 2014.
Russian Patent Application No. 2012111683—Office Action (English translation included), mailed Sep. 3, 2014.
Office Action issued in U.S. Appl. No. 12/531,956, dated Nov. 6, 2014.
International Search Report for PCT/AU2008/000405, mailed May 20, 2008.
International Search Report for PCT/JP2010/055479, mailed Jun. 22, 2010.
International Search Report for PCT/AU2010/001113, mailed Oct. 27, 2010.
International Search Report for PCT/JP2010/064984, mailed Nov. 22, 2010.
International Search Report for PCT/JP2010/064985, mailed Nov. 30, 2010.
International Search Report for PCT/AU2011/001647, mailed Mar. 23, 2012.
Derwent Abstract Accession No. 2006-110075/11, Osaka Gas Co Ltd., (Jan. 19, 2006), 2 pages.
Derwent Abstract Accession No. 2004-683934/67, Mitsubishi Chem Corp., (Sep. 30, 2004), 2 pages.
Derwent Abstract Accession No. 2004-395525/37, Shin Kobe Electric Machinery., (Apr. 30, 2004), 2 pages.
Derwent Abstract Accession No. 2005-135458/15, TDK Corp., (Jan. 27, 2005), 2 pages.
Office Action issued in U.S. Appl. No. 12/531,956, dated Feb. 21, 2012.
Office Action issued in U.S. Appl. No. 12/531,956, dated Aug. 1, 2012.
Office Action issued in U.S. Appl. No. 12/531,956, dated May 9, 2013.
Office Action issued in U.S. Appl. No. 12/531,956, dated Nov. 22, 2013.
Office Action issued in U.S. Appl. No. 12/531,956, dated Apr. 17, 2014.
Office Action issued in U.S. Appl. No. 13/265,944, dated Dec. 24, 2014.
Office Action issued in U.S. Appl. No. 13/265,944, dated Apr. 9, 2015.
Office Action issued in U.S. Appl. No. 13/392,774, dated Sep. 30, 2014.
Office Action issued in U.S. Appl. No. 13/392,774, dated May 21, 2015.
Office Action issued in U.S. Appl. No. 13/392,734, dated Jul. 7, 2014.
Office Action issued in U.S. Appl. No. 13/392,734, dated Feb. 27, 2015.
Office Action issued in U.S. Appl. No. 13/392,651, dated Jan. 17, 2013.

(56) References Cited

OTHER PUBLICATIONS

Office Action issued in U.S. Appl. No. 13/392,651, dated Oct. 25, 2013.
Office Action issued in U.S. Appl. No. 13/392,651, dated Jun. 18, 2014.
Office Action issued in U.S. Appl. No. 13/392,651, dated Dec. 9, 2014.
Office Action issued in U.S. Appl. No. 13/392,651, dated Apr. 6, 2015.
International Search Report for PCT/AU2007/001916 mailed Feb. 21, 2008.
Derwent Abstract Accession No. 2006-643026/67 Class L03 & JP 2006-252902 (*Kawasaki Heavy Ind Ltd.*), Sep. 21, 2006 (2 pages).
Derwent Abstract Accession No. 2006-003619/01 Class L03 & JP 2005-327489 (*Matsuhita Denki Sangyo KK.*), Nov. 24, 2005 (2 pages).
Derwent Abstract Accession No. 2006-036969/05 Class A85, L03 (A14) & JP 2006-310628 (*Nippon Zeon KK*), Nov. 9, 2006 (2 pages).
Chinese Patent Application No. 201080047297.07—First Notification of Office Action (English translation included), mailed Apr. 3, 2014.
European Patent Application No. 10814794.3—Search Report, mailed Dec. 2, 2013.
Japanese Patent Application No. 2012-52822—Office Action (English translation included), mailed Apr. 22, 2014.
Office Action issued in U.S. Appl. No. 12/531,956 dated Nov. 6, 2014.
U.S. Office Action issued in U.S. Appl. No. 13/996,934 dated Jul 9, 2015.
English translation of JP Office Action in 2009-540546 mailed Nov. 8, 2013.
Office Action issued in U.S. Appl. No. 12/531,956 dated Jul. 28, 2015.

\* cited by examiner

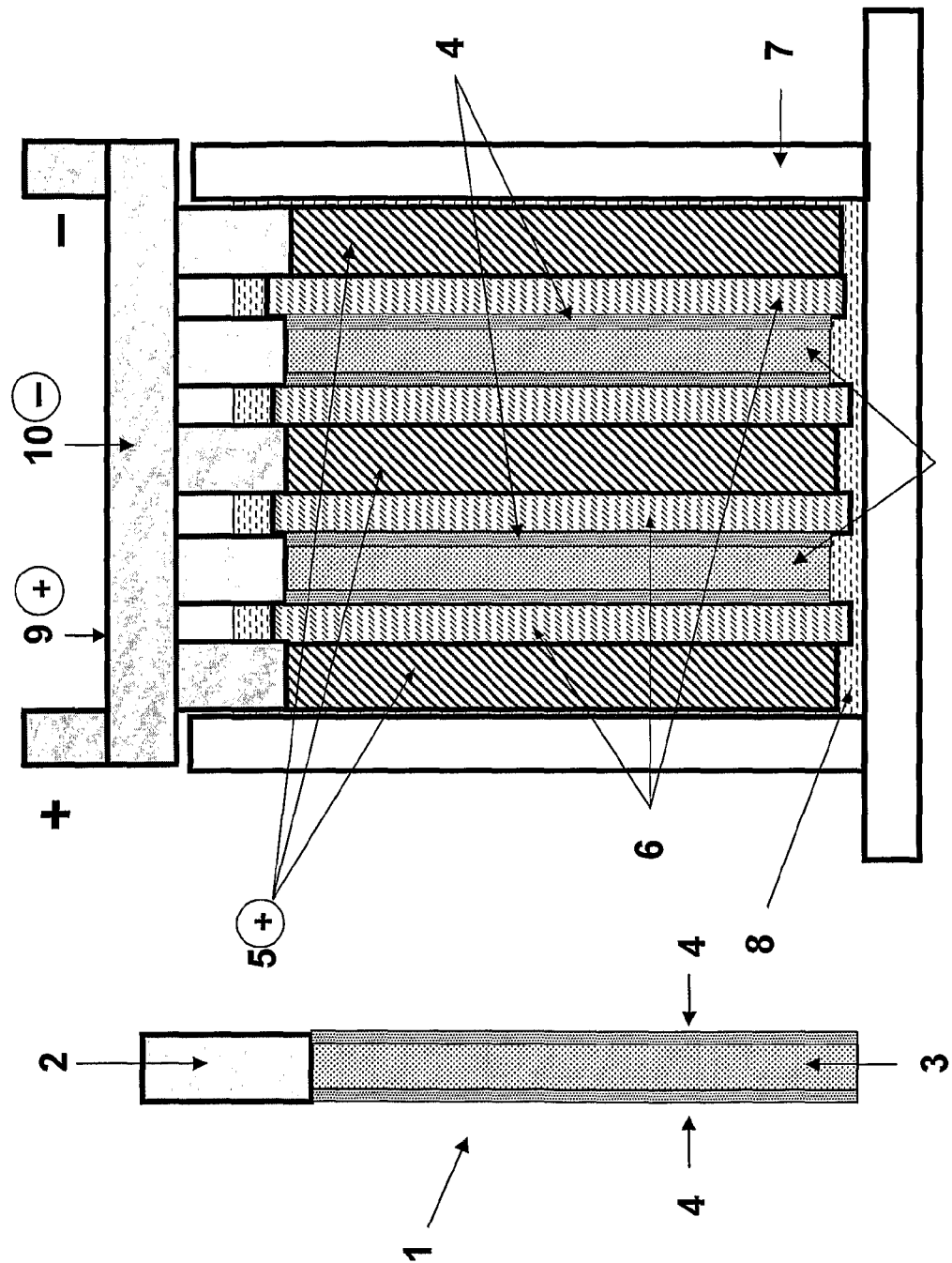

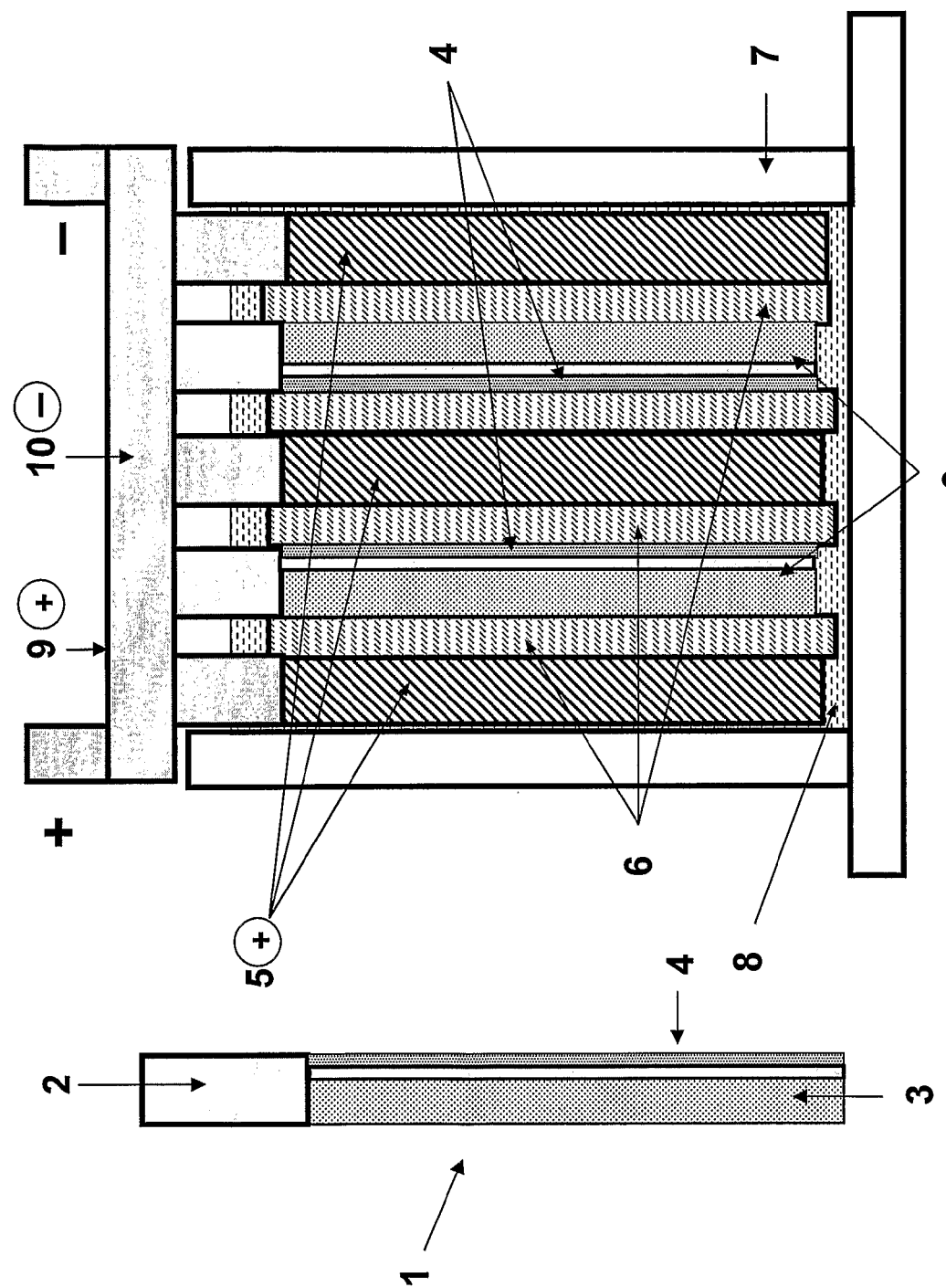

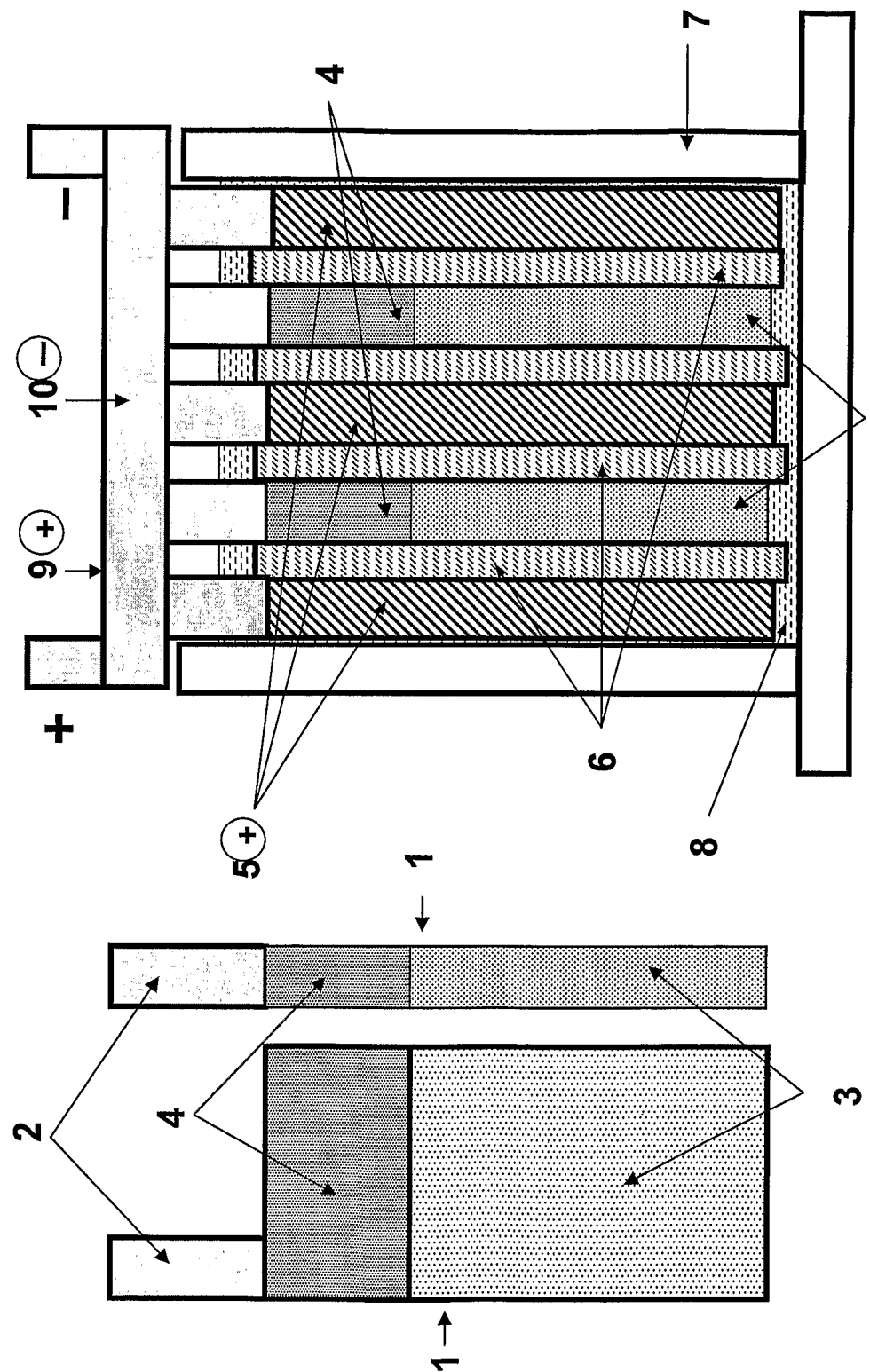

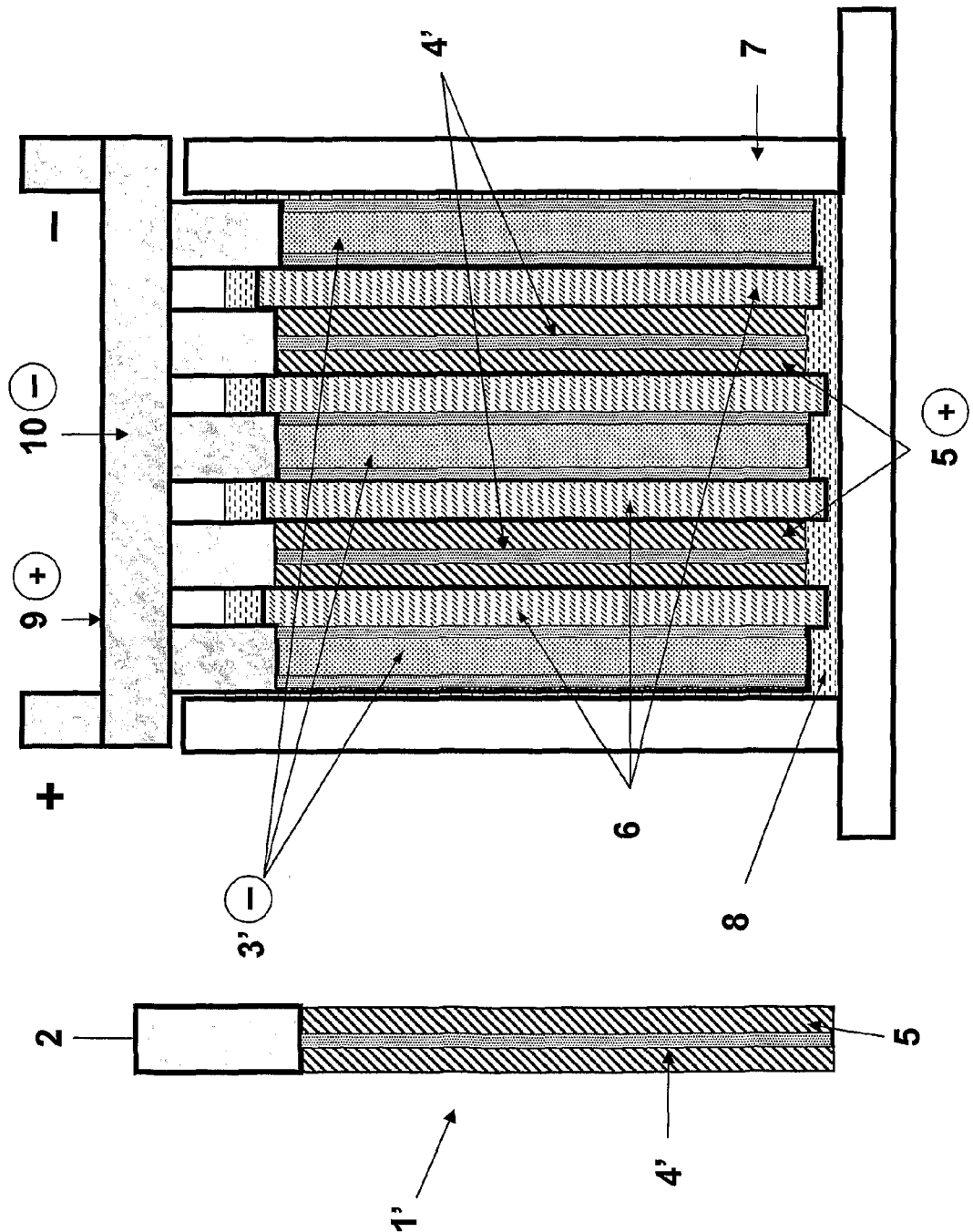

ENERGY STORAGE DEVICE

This application is the U.S. national phase of International Application No. PCT/AU2007/001916 filed 12 Dec. 2007 which designated the U.S. and claims priority to Australian Patent Application No. 2006906932 filed 12 Dec. 2006, the entire contents of each of which are hereby incorporated by reference.

BACKGROUND OF THE INVENTION

The present invention relates to energy storage devices, including lead-acid batteries, as well as electrodes and energy storage devices comprising such electrodes.

There is growing demand for batteries that enable high current to be drawn from the battery at various stages of operation, whilst being able to supply a lower, longer term current for other stages of operation. Such batteries are also required to be able to be recharged efficiently at high and low recharge rates. Applications for such batteries include use in conventional car battery applications, electric and hybrid electric vehicles, battery-powered vehicles such as forklift trucks, renewable energy applications such as solar panels and wind turbine where auxiliary battery power is required to smooth out power supply, and standby power applications such as UPS.

Whilst there have been many significant advances in the development of new batteries and power networks for vehicle and other applications, such batteries still suffer from a number of problems.

In all of these batteries, different demands are placed on the battery in terms of the current drawn from and recharged to the battery at various stages of operation. In the case of vehicle applications, as one example, a high rate of discharge is needed from the battery to enable acceleration or engine cranking in electric and hybrid electric vehicles, respectively. A high rate of recharging of the battery is associated with regenerative braking. In such high rate operations (and in high rate charging in other applications for the batteries) the battery preferably needs to be able to supply the high rate of discharge over a period of 1 minute or more.

In early stage lead-acid batteries used in these applications, failure of the battery tended to occur at the negative plate, as a result of progressive accumulation of lead sulphate on the surfaces of the negative plates. This occurs because the lead sulphate cannot be converted efficiently back to sponge lead during high rate recharging. Eventually, this layer of lead sulphate develops to such an extent that the effective surface area of the plate is reduced markedly, and the plate can no longer deliver the higher current demanded from the automobile. This significantly reduces the potential life span of the battery.

Recent improvements in the negative plates of such batteries has improved the situation to an extent that now the positive plates of the battery are likely to fail before the negative plates. It is therefore an object to improve the lifespan of the positive plates, and to further develop high performance batteries that make use of these improvements. There is also a need for modified batteries, such as lead-acid batteries, that generally have an improved life span and/or improved overall performance compared to current batteries.

SUMMARY OF THE INVENTION

According to the present invention there is provided an energy storage device comprising:

at least one negative electrode, wherein each negative electrode is individually selected from:
  (i) an electrode comprising negative battery electrode material;
  (ii) a capacitor negative electrode;
  (iii) a mixed electrode comprising either
    a mixture of battery and capacitor electrode material or
    a region of battery electrode material and a region of capacitor electrode material, or
    a combination thereof,
  and wherein the energy storage device either comprises at least one electrode of type (iii), or comprises at least one electrode of each of types (i) and (ii),
at least one positive electrode,
  wherein the positive electrode comprises positive battery electrode material and a charging ability-increasing additive.

It has been identified and shown by the applicant that the inclusion of a charging-ability increasing additive in the positive battery electrode material (typically adding during positive paste mixing), makes it is possible to increase the lifespan of the positive plate so as to be more closely matched to that of the negative plate—which itself has a longer life as a result of the electrode types used (which includes capacitor electrode material for high rate charging and discharging). Ideally, both electrode types are balanced so that the positive and negative plates fail at about the same time—although of course there will be occasions where failure will occur at one polarity before the other.

Charging ability refers to the ability of the given electrode to receive charge (during charging) and able to provide (during discharge) similar amount of charge. This is usually measured by reference to the ratio of electric quantity (e.g., ampere hour) input to (i.e., charge) and output from (i.e., discharge) the electrode (called charge-to-discharge ratio). In the ideal situation, the charge-to-discharge ratio of an electrode is 1. In practice, the charge-to-discharge ratio of the electrode is usually greater than one because some of the charge quantity received by the electrode during charge will lost due to heating and gassing under repetitive charge and discharge action. A test for identifying whether or not a given additive has charging ability-increasing properties is set out in the examples. This involves cycling the energy storage device through a charge profile to simulate standard operation of the device, and assessing the number of cycles achieved before a cutoff value is reached.

The charging ability of the positive lead dioxide electrode is also influenced by the following factors.
  (i) Electrolyte Concentration
    Decreasing the electrolyte concentration will increases the charging ability of the positive lead dioxide electrode. The specific density of sulphuric acid electrolyte used in manufacturing lead acid based energy storage devices of the present invention is suitably between 1.26-1.32.
  (ii) Plate Conductivity
    As mention above, during charge and discharge, part of charge received will transform to heat and gassing and, therefore, increasing the conductivity of the plate (electrode) material will reduce the heating effects. This can be achieved by:
      increasing the paste density of the positive lead dioxide electrode: previously densities of 3.8 to 4.3 g/cm³ were used, but here a density of from 4.2 to 4.7, suitably 4.4 to 4.7 g/cm³ gives better results; and reducing electrode thickness by using a thin grid (optimally from 0.8 to 2.2, such as 0.8 to 1.2 mm).

These factors can be applied as well as adding one of the identified charging ability-increasing additives to the positive battery electrode material through paste mixing.

These factors are not essential. Generally, the plate density can be between 4.0-4.7 g/cm³, and the grid thickness can be 0.8-6 mm thick.

(iii) Oxygen-evolution Rate

As mentioned above, during charge and discharge, part of charge received will transform to heat and gassing. Increasing electrode conductivity can minimize the heating, but not gassing. For the latter, oxygen-suppressing additives can advantageously be added to the positive plate material during paste mixing.

The effect of acid concentration on the charging ability of the positive lead dioxide electrode will be explained in detail in the Examples. The lead dioxide reacts with sulfuric acid and is converted to lead sulfate during discharge. Accordingly, the concentration of sulfuric acid solution decreases. On the other hand, the lead sulfate reacts with water and forms lead dioxide during charge. Consequently, the concentration of sulfuric acid increases. The conversion of lead sulfate to lead dioxide during charging is faster in acid solution with low concentration. Unfortunately, however, a battery using a low acid concentration gives low capacity during discharge. Thus, it has been found to be is better to use positive plate with high paste density (e.g., 4.4-4.7 g cm⁻³) and low volume of acid solution with specific gravity of about 1.28. Since the positive plate with high paste density will have less porosity than that with low paste density, the diffusion of acid solution either from the bulk solution to the interior of the positive plate, or from the interior of the positive plate to the bulk solution is more difficult. Thus, after discharge, the acid concentration in the interior of positive plate with high paste density will be decreased to a very low value and this will promote the charging of lead sulfate back to lead dioxide during the subsequent recharge. Furthermore, increasing paste density will reduce the porosity of the plate material. This will enhance the contact of the individual particles and, therefore, increase the conductivity of the pasted material.

The charging ability-increasing additives, in this case, comprise conductive material. Oxygen-suppressing material is also advantageously used together with the charging ability-increasing additives in the positive electrode material. Amongst the charging ability-increasing additives that may be used, the following work extremely well:

(a) a conductive carbon material selected from carbon nanomaterial, such as carbon nanotube or carbon nanofibre, vapour grown carbon fibre (VGCF) and/or fullerene, and (b) tin dioxide conductive materials, such as tin dioxide nanotubes, tin dioxide nanorods and/or tin dioxide coated glass flake, fibres or spheres.

The amount of charging ability-increasing additive to be used in the positive electrode material may be 0.05-10% by weight, based on the total weight of positive electrode material applied during production of the positive electrode. Such application is generally by way of pasting the positive electrode material in paste form to a current collector, such as a grid. Typically, the amount of additive may be used is between 0.1% and 1.0% by weight, such as 0.1-0.5% by weight. The amounts of charging ability-increasing additive are based on the total of the charging ability-increasing additive, where this comprises more than one component.

Examples of suitable oxygen-suppressing materials are one or more of the following materials:

an oxide, hydroxide or sulfate of antimony,
an oxide, hydroxide or sulfate of bismuth,
an oxide, hydroxide or sulfate of arsenic.

The amount of the above oxygen-suppressing additive may be as follows:

0-500 ppm antimony (e.g. 20-200 ppm)
100-1000 ppm bismuth (e.g. 200-600 ppm)
0-500 ppm arsenic (preferably 20-200 ppm).

The ppm amounts are based on the amount of additive to the active electrode material (or precursor), as measured during paste mixing. In the case of a lead dioxide positive electrode material, this is parts per million based on the lead oxide in the paste mixture.

According to the present invention, there is also provided a new type of electrode for an energy storage device, the electrode comprising a current collector and at least one region which is pasted with a paste coating, wherein the paste coating comprises a mixture of battery electrode material and between 0.05-15%, by weight of the paste coating, of one or more of:

(a) a capacitor electrode material which comprises:
  5-85 weight % carbon black
  20-80 weight % activated carbon
  0-25 weight % carbon material other than carbon black and activated carbon, such as carbon fibre, graphite, carbon nanotube and/or fullerene,
  0-30 weight % binder, and
  0-20 weight % of a capacitor additive material,
(b) carbon nanomaterial, VGCF and/or fullerene, and
(c) tin dioxide-based conductive material.

For positive electrodes suitable for use in lead-acid types of energy storage devices, the battery electrode material is suitably lead dioxide or lead oxide, which converts to lead dioxide during formation. In this case, the material mixed with the battery electrode material is selected from (b) and (c).

For negative electrodes suitable for use in lead-acid types of energy storage devices, the battery electrode material is suitable sponge lead or lead oxide, which converts to sponge lead in formation. In this case, the material mixed with the battery electrode material is material (a).

The capacitor additive material for the negative electrode suitably comprises one or more additives selected from oxides, hydroxides or sulfates of zinc, cadmium, bismuth, lead, silver. The amounts of these additives may suitably be as follows:

0-5% zinc (preferably 0.02-1%)
0-2% cadmium (preferably 0-1%)
0.01-2% bismuth (preferably 0.02-1%)
0-10% lead (preferably 2-6%)
0-5% silver (preferably 0.02-2%)

It has been found in particular that the use of the capacitor material in an amount of about 0.5-15 wt %, such as 2-10 weight %, based on the weight of active material of the negative battery electrode, provides significant advantages to energy storage devices.

According to another aspect, an appropriate form of the energy storage device is a hybrid battery-capacitor.

In one form, the hybrid battery-capacitor may comprise:
  at least one positive electrode comprising positive battery electrode material with the addition of charge ability-increasing additive (as described previously),
  at least one negative electrode or electrode region comprising negative battery electrode material, capacitor material incorporated into at least one negative electrode of the device, either:
- as a mixture with negative battery electrode material;
- as a region of capacitor material on the negative electrode comprising battery electrode material;
- on a separate negative electrode bearing capacitor material and no battery electrode material; or
- in a combination of these locations, and an electrolyte in contact with the electrodes.

The device may comprise further battery electrodes, capacitor electrodes or mixed electrodes comprising battery and capacitor electrode material.

According to one embodiment, the positive electrode may further comprise a region of capacitor material. This may be located in any location on the electrode, but is most suitably located on a current collector of the positive electrode, with the battery electrode material applied on top.

The hybrid battery-capacitor includes battery material and capacitor material, with each negative and positive electrode connected in parallel in the common unit. As a consequence, the capacitor material in the electrodes preferentially takes or releases charge during high current charging or discharging, and the battery material will take or release charge during low-current charging or discharging. Consequently, the capacitor material will share the high-rate operation of the battery, and will provide the battery with significantly longer life. All of this is achieved without any electronic control or switching between the battery and capacitor parts.

The positive battery material may be of any of the known types, although lead dioxide is one particular example. Similarly, the negative battery electrode material may be of any of the known types, with lead being an example. It is noted that prior to the step of formation of the electrode, the material applied to the electrodes may be a compound of lead, such as lead oxide, which can be converted into sponge lead or lead dioxide at the respective polarities.

If combined with acid electrolyte, the hybrid device will be based on a lead-acid battery design which is most appropriate for many applications.

The hybrid battery-capacitor may comprise an alternating series of positive and negative electrodes. Of the alternating electrodes, each of these may be a battery electrode, a capacitor electrode, or a combined battery/capacitor electrode. These electrode types will be described in further detail below.

It has also been found that if there is a mismatch in the potential window or potential operational range of one of the electrodes, oxygen and hydrogen gassing may occur. This particularly applies when the cell voltage is greater than the potential range of an electrode. Hydrogen gassing is undesirable as it leads to premature failure of the battery at the electrode where gassing occurs.

To avoid a mismatch, according to one embodiment, the capacitor material on the negative electrode and/or the positive battery electrode materials used in the device should have a particular constitution to minimize gassing. The negative capacitor material suitably comprise a high surface area capacitor material and one or more additives selected from oxides, hydroxides or sulfates of lead, zinc, cadmium, silver and bismuth. The additives are preferably added in oxide form. The additive is preferably the mixture of the above additives.

The oxygen suppressing additives suitable for use in the positive battery electrode material are antimony, bismuth and arsenic, which have been described previously.

BRIEF DESCRIPTION OF THE DRAWINGS

FIG. 1 is a schematic side view of a lead-acid energy storage device in accordance with one embodiment of the invention;

FIG. 2 is a schematic side view representing the electrode configuration of the energy storage device of FIG. 1;

FIG. 17 is a schematic side view representing the electrode arrangement of a battery of a third embodiment of the invention;

FIG. 18 is a schematic side view of one of the lead-acid negative electrodes with one surface being coated by a layer of capacitor material;

FIGS. 19 and 20 are the front and side views of one of the lead-acid negative electrodes with a region pasted with capacitor material;

FIG. 21 is a schematic side view representing the electrode arrangement of a lead-acid battery of a fourth embodiment of the invention using negative electrodes with configuration of FIGS. 19 and 20;

FIG. 24 a schematic side view representing the electrode arrangement of a battery;

FIG. 25 is a schematic side view of one of the positive electrode with a coating of capacitor electrode material on the current collector and with a subsequent battery positive material pasted thereon.

DETAILED DESCRIPTION OF THE INVENTION

Figure 3:
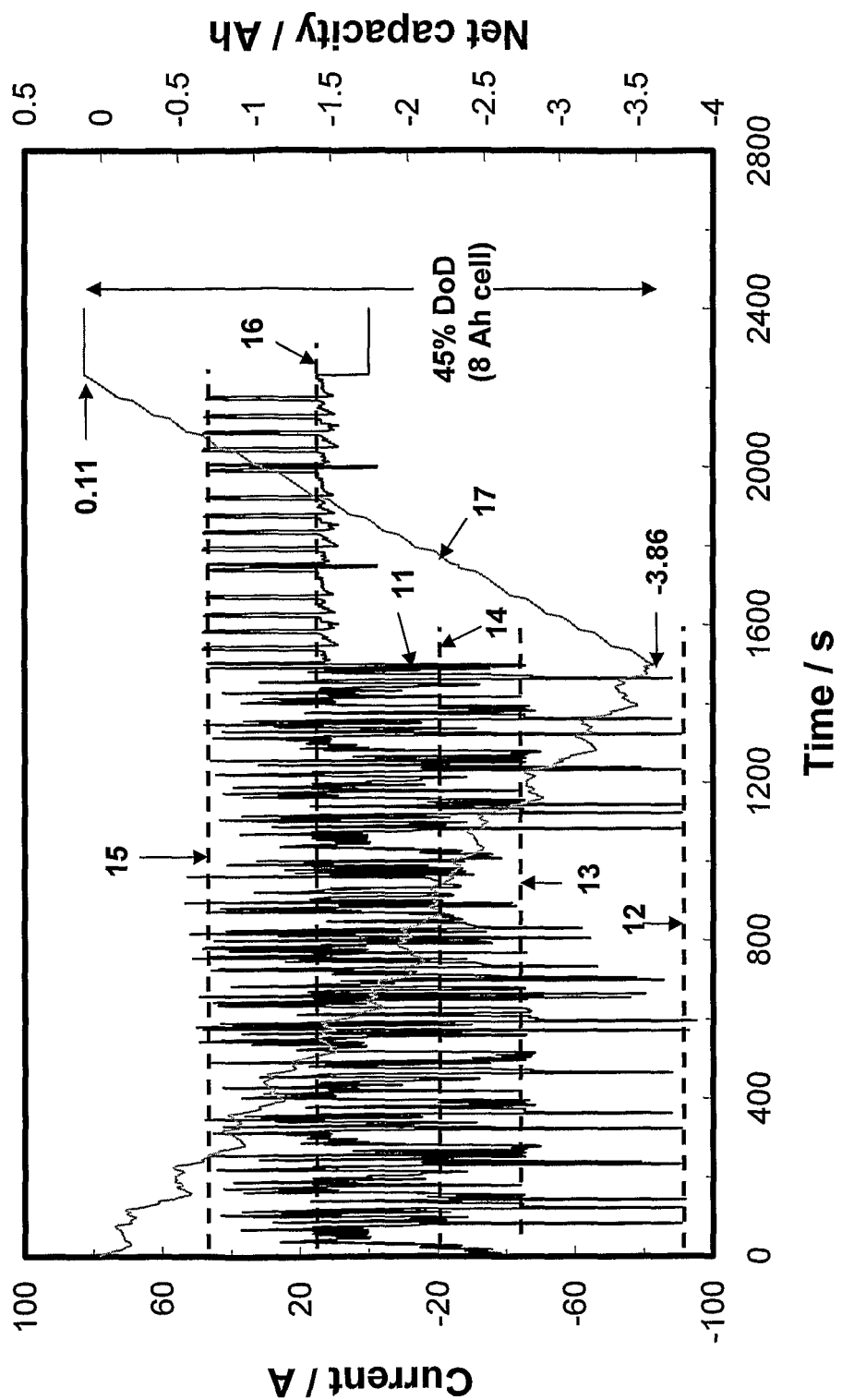
FIG. 3 is a graph of the test profile used to simulate the high-speed and hill-ascending/descending driving conditions of a hybrid electric vehicle.

The present invention will now be described in further detail with reference to preferred embodiments of the invention.

To avoid any doubt, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

General Features

The term "energy storage device" refers to any device that stores energy. This may be through electrochemical reactions, through charge separation (i.e. capacitively—as in the case of a capacitor) or through a combination of these mechanisms.

The term "battery" is used broadly to refer to any device that principally stores energy electrochemically. As one example of this, the term "lead-acid battery" is used in its broadest sense to encompass a unit containing one or more lead-acid battery cells.

The lead-acid batteries described contain at least one lead-based negative electrode or region, at least one lead dioxide-based positive electrode, and capacitor material in or on one or more of the negative electrodes.

The term "hybrid battery-capacitor" is used in its broadest sense to refer to any hybrid device containing positive and negative electrodes, including battery material and capacitor material, so as to store energy electrochemically and capacitively. The term "hybrid" is a reference to the presence of battery material and capacitor material in the one device.

In the following the various possible electrode types are described, followed by the electrode region concept.

Where it is stated that the energy storage device contains at least one electrode of type (iii) (the mixed electrode), or at least one electrode of each of types (i) (the battery electrode) and (ii) (the capacitor electrode), it may alternatively be said that when the device contains no electrode of type (iii), the energy storage device comprises at least one electrode of type (i) and at least one electrode of type (ii). Each type of electrode—battery electrode, capacitor electrode and the mixed electrode—is described in further detail below.

Electrode Structure

Electrodes generally comprise a current collector (otherwise known as a grid), with the active electrode material applied thereto. The active electrode material is most commonly applied in a paste form to the current collector, and in the present specification the term paste applies to all such active-material containing compositions applied in any way to the current collector. When used in the context of electrodes "comprising" a certain material, this expression indicates that the electrode contains the named material, and may include other materials. Such an electrode may suitably be based on that electrode material, such that it has the function of that electrode type only. The term "based" used in the context of electrodes is intended to refer to the active electrode material. This term is used to avoid suggesting that the electrode is formed entirely from the active material, as this is not the case. The term also is intended to indicate that the active material of the given electrode may contain additives or materials other than the active material specifically mentioned. Binder is one non-limiting example.

Electrodes Comprising Negative Battery Electrode Material

The negative battery electrodes used in the present invention may be of the lead-acid battery type, or electrodes of other types. Negative lead battery electrodes are described in further detail below. The alternative battery electrode types are those used in nickel rechargeable batteries, lithium metal or lithium ion rechargeable batteries, and so forth. Suitable negative battery electrode materials in this class include zinc, cadmium, metal hydrides, lithium in metal or alloy form with other metals such as aluminium, and lithium ion intercalation materials. The details of, and alternatives for, these electrode materials used in various battery types are known to persons in the art, and can be gathered from publications in the art.

Positive Electrodes, Comprising Positive Battery Electrode Material

The positive battery electrodes used in the present invention may be of the lead-acid battery type, or of other types. Positive lead dioxide (or lead oxide, convertible to lead dioxide) battery electrodes are described in further detail below. The alternative battery electrode types are those used in nickel rechargeable batteries, lithium metal or lithium ion rechargeable batteries, and so forth. Suitable battery-type positive electrode materials in this case include nickel oxide, silver oxide, manganese oxide, lithium polymer materials, mixed lithium oxides including lithium nickel oxides, lithium cobalt oxides, lithium manganese oxides and lithium vanadium oxides, and lithium conductive polymer cathode materials. The details of, and alternatives for, these electrode materials used in various battery types are known to persons in the art, and can be gathered from publications in the art. The principles described in this application for maximizing and balancing the capacity of each of the negative and positive plates (using lead-acid batteries as the example) can be applied similarly to other battery types.

Lead and Lead Dioxide Based Electrodes.

In the case of lead and lead dioxide electrodes, these may be of any arrangement or type suitable for use in a lead-acid battery. Generally, such electrodes are in the form of a metal grid (usually made from lead or lead alloy) that supports the electrochemically active material (lead or lead dioxide) which is pasted onto the grid. The operation of pasting is well known in the field. Although any suitable lead or lead dioxide known in the art may be used, it would be advantageous to use the lead compositions disclosed in co-pending application PCT/AU2003/001404. It is to be noted that, prior to formation of the battery, the active material may not be in the active form (i.e. it may not be in the form of the metal, or in the dioxide form). Thus, the terms "lead" and "lead dioxide" encompass those other forms which are converted to lead metal (sponge lead) or lead dioxide when the battery is formed.

Charging Ability-increasing Additive for Positive Electrodes

Two subclasses of conductive material have been described as providing good charging ability-increasing properties.

(i) The Carbon-based Conductive Materials: Carbon Nanomaterials, VGCF and/or Fullerene The term "carbon nanomaterial" is used to refer generally to carbon materials with a particle size of from less than one nanometer (eg 0.5 nm) up to 500 nm. This encompasses carbon nanotubes and carbon nanofibres.

Carbon nanotubes are commonly prepared by depositing carbon precursors within the pores of porous inorganic materials, followed by the dissolution of the inorganic template. They are commonly of between 0.9 nm and 50 nm in diameter. On occasion, a carbon nanotube material may contain non-hollow fibres. These may be described as nanofibres. Thus, a mixture of the two materials may be present in a "nanotube" material.

Another conductive carbon material that provides these properties is vapour-grown carbon fibre. These fibres are generally of 0.1 μm to 100 μm in diameter.

Fullerenes are molecules based on carbon, in the form of hollow spheres, ellipsoids or tubes. Fullerenes are generally between 0.5 nm to 4 nm in diameter. Fullerenes are structured carbon-based molecules of at least $C_{60}$ carbon atoms.

Carbon nanotubes, VGCF and fullerenes give increased charging ability. In contrast, other materials that have been tested such as graphite, and capacitor material (comprising carbon black and activated carbon) do not provide the requisite increased charging ability.

(ii) Tin Dioxide Conductive Materials

Tin dioxide conductive materials include tin dioxide nanotubes, tin dioxide nanorods or nanofibres, and tin-dioxide (or other metal oxide)-coated glasses, sometimes referred to as "conductive glasses".

Conductive glasses comprising tin dioxide and other metal alloy-coated glass materials are used in sheet form in various applications including display technology and microstructuring applications. Tin dioxide conductive glass additives of interest in this application are flake, fibre or sphere forms of conductive glasses, having size characteristics that enable the material to provide conductivity, high surface area, and porosity to the positive electrode. This additive is preferably electrolyte-stable. In the case of an acid electrolyte, the additive is suitably acid-stable.

It has been described above that charging ability refers to the ability of the given electrode to receive charge (during charging) and able to provide (during discharge) similar amount of charge. The test used to evaluate the charging ability of the given electrode involves discharge and charge the electrode successively at 1-h or 2-h capacity rate within a given state-of-charge windows (e.g., between 20 and 80% state-of-charge) until the cell voltage or the positive-plate potential reached a cut-off value. Furthermore, during cycling, the discharge and charge capacity should be maintained equally. The electrode having the best charging ability will achieve the greatest cycle number (number of discharge and charge) before its potential reaches the cut-off value. By comparing the results of this test for an electrode with the additive and for the same electrode without the additive, an assessment can be made as to whether or not the additive has increased the charging ability of the electrode. In this context, the term "plate" refers to the total electrodes of the same charge (i.e. positive electrodes or negative electrodes), rather than an individual electrode, in an energy storage device.

Assessment of whether the charging ability has increased will be evident irrespective of the cycle or capacity rate used—based on a comparison of the reference sample (without additives) to the additive-containing sample. The additive should provide about a minimum 10% or 15% increase in cycle life. Whilst that is the case, it is useful to use the test profile shown in FIG. 14, as a universal standard.

Capacitor Electrodes and Capacitor Material

Capacitor electrodes typically comprise a current collector and a coating of a capacitor material. This is commonly applied as a paste.

The term "capacitor" is used in the context of electrodes to refer to electrodes or electrode regions that store energy through the double layer capacitance of a particle/solution interface between high surface area materials and an electrolyte solution.

Generally, as with the lead and lead oxide electrodes, the capacitor electrode comprises a current collector, such as a metal grid (usually made from a lead alloy) and a pasted coating containing the capacitor material, usually with a binder. Examples of a suitable binders for the paste compositions are carboxymethyl cellulose and neoprene.

The capacitor electrode material comprises a high surface area (or high-rate) materials suitable for use in capacitors. Such materials are well known in the art. These high-rate capacitor materials include high surface area carbon, ruthenium oxide, silver oxide, cobalt oxide and conducting polymers. Preferably, the capacitor material comprises a high surface area carbon material. Examples of high surface area carbon materials are activated carbon, carbon black, and carbon materials other than these two, such as amorphous carbon, carbon nanoparticles, carbon nanotubes, carbon fibres.

According to one embodiment, the capacitor material comprises:

5-85 weight % carbon black
20-80 weight % activated carbon
0-25 weight % carbon material other than carbon black and activated carbon, such as carbon fibre, graphite, carbon nanotube and/or fullerene,
0-30 weight % binder, and
0-20 weight % of a capacitor additive material.

A suitable activated carbon material is one with a surface area of between 1000 and 3000 m$^2$/g, preferably 1000-2500 m$^2$/g. One suitable carbon black material has a surface area of between 60-1000 m$^2$/g. One suitable mixture of these materials comprises between 5-85% carbon black, 20-80% activated carbon, 0-20% other carbon material, 0-20% optional capacitor additives, and the balance binder at a level of between 0-30%, or 5-25% when present. When capacitor material is used as a charging ability-increasing additive for positive battery electrode material, the binder may be provided as a component of the battery electrode paste material, and consequently may not need to be supplied as a component of the capacitor material (as additive to the battery electrode material). All measurements are by weight unless specified otherwise.

Additive Content of Capacitor Material

The capacitor electrode material suitably comprises an additive to suppressing hydrogen and/or oxygen gassing. The additive for capacitor negative electrode materials used in a lead-acid energy storage device environment suitably comprises an oxide, hydroxide or sulfate of lead, zinc, cadmium, silver and bismuth, or a mixture thereof. Generally, it is preferred that the additive includes at least one oxide, hydroxide or sulfate of lead or zinc. For convenience, the additive is suitably one or more oxides selected from lead oxide, zinc oxide, cadmium oxide, silver oxide and bismuth oxide. Preferably each of the capacitor negative electrodes contains the additive in addition to the high surface area capacitor material. Due to toxicity reasons, cadmium compounds are not preferred, and therefore the composition preferably comprises a lead compound and/or zinc compound and/or bismuth compound, and optionally a silver compound.

Irrespective of the form in which the additive is added, when capacitor material comes into contact with the electrolyte (for example, sulfuric acid), the additive may react with the electrolyte and thus be converted into another metal compound derived from the original metal oxide, sulfate or hydroxide. References to the oxides, sulfates and hydroxides of the subject additives are to be read as encompassing the products of the reactions between the additives and the electrolyte. Similarly, if during the charged or discharged state of the battery the additive is converted into another form through redox reactions, the references to the oxides, sulfates and hydroxides are to be read as encompassing the products of the redox reactions on these additives.

Suitable additives for positive capacitor electrode material (high surface area material as described above) to suppressing oxygen gassing, are:

an oxide, hydroxide or sulfate of antimony,
an oxide, hydroxide or sulfate of bismuth,
an oxide, hydroxide or sulfate of arsenic.

The compound of antimony is beneficial in suppressing (oxygen) gassing at the positive capacitor electrode. However, if it migrates to the negative capacitor electrode, it produces an adverse effect on hydrogen gassing at that electrode. In the absence of an agent to fix the antimony compound to the positive capacitor electrode, when the antimony compound comes into contact with the electrolyte, it may dissolve in the electrolyte, and be deposited on the negative electrode when a current is applied. The red lead can be used to fix or prevent transfer of the antimony to the negative electrode. Compounds (i.e. oxides, sulfates or hydroxides) of bismuth and arsenic are also advantageous in this electrode, and may also be used in the additive mixture.

In each case, the capacitor additive is used in an amount to avoid hydrogen and oxygen gassing. This is generally an amount that increases the potential window of the capacitor negative electrode and the positive battery electrode from the typical ±0.9V or +1.0V to at least ±1.2V, and preferably at least ±1.3V. In general terms, the total oxide content may be between 5-40 wt %, based on the total active material composition (including high surface active material, binder, and any other component in the dried paste composition).

The negative capacitor electrode additive may comprise between 0-40 wt % Pb compound (such as 0-20%), 0-20 wt % Zn compound (such as 0-10%), 0-5 wt % Cd compound and 0-5 wt % Ag compound. The total should be within the 2-40 wt % range mentioned above. The use of ZnO additive alone provides good results, as does PbO alone, or a mixture of PbO and ZnO.

The positive capacitor material additive may comprise between 0-20 wt % $Pb_2O_3$ (such as 1-10 wt %), 0.01-1 wt % Sb (such as 0.05-0.1 wt %) in oxide, sulfate or hydroxide form, 0.02 to 1 wt % Bi in oxide, sulfate or hydroxide form and 0.01-0.06 wt. % As in oxide, sulfate or hydroxide form. Sb is suitably added as an oxide. The total should be 5-40 wt % range mentioned above.

Mixed Electrodes

According to certain embodiments, the energy storage device contains one or more mixed electrodes.

Mixed Electrode of First Class

A first class of mixed electrode comprises a mixture of battery and capacitor electrode material. This mixed material can be pasted onto a current collector (grid) to provide an electrode that stores energy both electrochemically and capacitively. Having this material in a mixed form (evenly distributed, or unevenly distributed, but without clear regions containing one material without the other) provides the advantage of productivity. This makes construction of the device more simple. A single mixture of the material can be prepared, pasted onto the current collector and formed. Formation can be performed by the two procedures, namely tank formation or container formation. These formation procedures are well known in the field. For electrodes having separate regions, the process requires at least two pasting steps to place the battery electrode material on the current collector, to cure and dry this, or to cure, dry and form and then to apply the capacitor electrode material.

The capacitor material preferably constitutes 0.5-15% of the mixed electrode material applied to the current collector, by weight, with the balance being battery electrode material, binder and any optional additional additives. More preferably, the capacitor material constitutes 2-10% by weight.

The capacitor material used in this case suitably comprises:
5-85% carbon black
20-80% activated carbon
0-25% carbon materials other than carbon black and activated carbon,
0-30% binder, and
0-20% negative capacitor additive material (such as 1-10% of such additive material, when present)

The additives to capacitor negative electrode or capacitor material mixed with battery negative material during paste mixing are similar to those mentioned above, although the amount of binder is different. The amount of binder used for capacitor material mixed battery negative material is generally less than that used to make capacitor electrodes.

Mixed Electrode of Second Class

The mixed electrode may comprise a region of battery electrode material and a region of capacitor electrode material. The term "region" is used to refer to any section, segment, layer, area or any other part of an electrode that is of the electrode material of the stated type as distinct from the other electrode material type. As an example, the electrode could be prepared as a battery electrode, with a paste coating on both sides of battery electrode material, and a layer of capacitor electrode material (a region) applied on top of the battery electrode material on one or both faces. Alternatively, the region of capacitor electrode material may be applied on one face, or on a section or segment of it, directly to the grid. It is noted that in this context, the battery electrode material may contain up to 15 wt % of capacitor electrode material (for the benefits described above), and the region will be considered to be a "battery electrode material" region if the dominant behaviour of the electrode region is that of a battery electrode. Thus, the presence of a small amount of capacitor material in the battery electrode material will not result in that region being considered not to be a battery electrode region.

The amount of capacitor electrode material forming the region of capacitor electrode material may be from 1%-15 wt % of the battery electrode material, such as 2%-7%.

The energy storage devices of the first aspect are required to have negative electrodes that store energy both capacitively through an electric double-layer effect and electrochemically, and therefore the device is required to comprise either electrodes of the mixed type (iii), or a combination of type (i) and type (ii) electrodes. According to certain embodiments, the device comprises a plurality of electrodes of type (iii), and according to one particular embodiment, the electrodes of type (iii) comprise regions of battery electrode material and capacitor electrode material. The regions of capacitor electrode material may be constituted by a coating of capacitor electrode material on both faces of a battery electrode.

Regions

Unless the contrary indication is expressed, it will be understood that the electrodes of the present invention may be composite electrodes (i.e. they may be composites of battery electrode materials and capacitor electrode materials). The references to "lead-based", "lead dioxide-based", "battery" and "capacitor" electrodes encompass the regions of an electrode that have the specified function as the dominant function of that region, irrespective of whether or not the single electrode has other regions of a different dominant type or function.

According to one embodiment of the invention, electrodes having regions of different types are deliberately used. According to this embodiment, one or more of the negative electrodes has at least two regions, including a battery-electrode material region and a capacitor-electrode material region. As one example, the electrode having two regions comprises an electrode current collector, which may be of the type described above, having one face pasted with battery electrode material (such as lead) and the opposite face pasted with capacitor negative electrode material. Alternatively, a battery-type electrode containing battery electrode material on both sides may be coated on one face or on both faces, or any other region thereof, by capacitor electrode material. One mixed electrode type of particular interest is one containing battery-type electrode material on both sides, and a top-coating on those sides of capacitor electrode material. The coating arrangement is suitably the reverse for positive electrodes, with the top-coating being battery electrode material overlying capacitor material.

Physical Configuration

The electrodes may be of any suitable shape, and therefore may be in flat-plate form or in the form of a spirally-wound plate for the formation of either prismatic or spirally-wound cells. In the case of spirally wound cells, previous references to faces of the electrode should be understood to refer to the uncoiled electrode. For simplicity of design, flat plates are preferred.

Electrolyte

In the case of lead-acid batteries, any suitable acid electrolyte may be used. The electrolyte may, for instance, be in the form of a liquid or a gel. Sulphuric acid electrolyte is preferred.

In the case of other battery types, the electrolyte may be an aqueous or organic electrolyte, including alkalis such as potassium and other hydroxides, lithium-ion containing organic solvents, polymer electrolytes, ionic liquid electrolytes in liquid or solid state and so forth. Suitable electrolytes for the chosen battery positive and negative electrode materials can be routinely selected by a person skilled in the art.

Busbars or Conductors

The busbar of the energy storage device, such as lead-acid battery, may be of any suitable construction, and may be made from any suitable conductive material known in the art. The term "connected to" used in the context of the busbars refers to electrical connection, although direct physical contact is preferred. In the case of other battery types, any conductor may be used that does not involve circuitry external to the battery.

Other Energy Storage Device Features

Generally, the components of the energy storage device such as battery will be contained within a case, such as a "battery" case, with further features appropriate to the type of energy storage device employed. For example, in the case of lead-acid energy storage device, the lead-acid energy storage device may be either of a flooded-electrolyte design or of a valve-regulated design. Where the lead-acid energy storage device is a valve-regulated lead-acid energy storage device, the energy storage device may be of any suitable design, and may for instance contain gel electrolyte. Specific features of the energy storage device unit appropriate to such designs are well known in the art of the invention.

The pressure of the plate-group (e.g., positive and negative plates, together with separators) when assembled into the lead-acid battery case may lie in the range of 1-60 kPa for flooded electrolyte design, and from 20-80 kPa for valve regulated lead-acid energy storage device design.

Separators

Generally, each of the positive and negative electrodes is separated from adjacent electrodes by porous separators.

The separators maintain an appropriate separation distance between adjacent electrodes. Separators located between immediately adjacent surfaces of lead-based negative electrode material and surfaces of lead dioxide-based positive electrode material, or similar, may be made from any suitable porous material commonly used in the art, such as porous polymer materials or absorptive glass microfibre ("AGM"). The separation distance (corresponding to separator thickness) is generally from 0.4-5 millimeters for these separators dependent upon the battery designs (flooded-electrolyte or valve-regulated designs) and the thicknesses of the positive and negative plates. Suitable polymer materials useful for forming the separators are polyethylene and AGM. Polyethylene separators are suitably between 0.4 and 1.5 millimeters thick, whereas AGM separators are appropriately between 0.4 and 2.5 millimeters thick.

In the case of separators located between or adjacent surfaces bearing capacitor electrode material, these are suitably much thinner than the separators between adjacent battery electrodes. Advantageously, the separators are between 0.01 and 0.1 millimeters thick, and most preferably between 0.03 and 0.07 millimeters thick. These separators are suitably made from microporous polymer material such as microporous polypropylene. Other separators are AGM and the thickness of this type of separators is between 0.1 and 1 millimeters, and preferably between 0.1 and 0.5 millimeters.

Formation of Lead Acid Energy Storage Devices

Generally, battery-type energy storage device electrodes need to go through a stage of formation. The formation operation is well known in the field. Through the process of formation, in the case of lead-acid energy storage devices, the oxidation state of the lead-based material that is pasted onto the electrodes is converted into the active state—or charged. It is to be understood that the references to "lead-based" and "lead dioxide-based" materials are used to refer to lead or lead dioxide itself, materials containing the metal/metal dioxide or to materials that are converted into lead or lead dioxide, as the case may be, at the given electrode. In some cases it is possible for electrodes to be formed in a large-scale tank (called tank formation). Otherwise, formation needs to take place after assembling of the appropriate components together in the case (called container or jar formation).

An energy storage device will always contain at least one positive and one negative electrode. The number of individual cells (made up of a negative and positive electrode) in the battery depends on the desired voltage of each battery. For a 36-volt battery (which may be charged up to 42 volt), this would involve the use of 18 cells, which are connected in series.

Electrode Arrangement

According to one embodiment, the positive and negative electrodes are interleaved in an alternating arrangement. In one embodiment, each positive electrode may be designed with one lead-based negative electrode to one side of it, and one capacitor negative electrode or electrode face to the opposite side. Accordingly, the arrangement of one embodiment has alternating positive and negative electrodes, with the negative electrode faces across from each outer face of the positive electrode being alternately a lead-based electrode face and a capacitor negative electrode face.

All of the negative electrodes (battery, capacitor and/or mixed) are connected to the negative busbar, and the positive electrodes are connected to the positive busbar, so that each electrode of the same polarity is connected in parallel in the common lead-acid battery.

Operation

As explained above, the capacitor material in the lead-acid energy storage device arrangement described has a lower internal resistance than the lead-acid battery material, and therefore it will first absorb a release charge during high-rate charging or during high-rate discharge. Consequently, the capacitor material will share the high-rate operation of the lead-acid battery material and will provide the lead-acid battery with significantly longer life. More specifically, the uneven distribution of lead sulfate developed across the cross-section of the negative plates which generally occurs during high-current charging and discharging of the battery is minimized because the high-current charging and discharging is generally taken up by the capacitor material.

Each battery cell of one embodiment of the invention provides a voltage of 2-volts. A lead-acid battery of one embodiment suitable for use in the broad range of applications may contain 8 negative electrodes and 9 positive electrodes in an alternating arrangement. Variations in this arrangement and relative numbers of electrodes are also suitable, provided that there is a minimum of one of each electrode.

EXAMPLES

Reference Example 1

A lead-acid based energy storage device suitable for testing purposes was made in the arrangement as illustrated schematically in FIGS. 1 and 2.

The device includes two composite negative electrodes (1), which include a current collector (2) with battery negative material (3) pasted thereon, and with a coating of capacitor electrode material (4) on each face of either cured or formed negative material, forming the composite negative electrodes. The device also includes lead dioxide positive electrodes (5) which may or may not contain an additive material, depending on the experiment. The positive and negative electrodes were positioned in an alternating arrangement as illustrated in FIG. 1 in a battery case (7). The positive lead dioxide electrodes (5) can be 20-500 millimeters wide by 20-1200 millimeters high by 0.6-5 millimeters thick. The composite negative electrodes (1, comprising 3 and 4) were of the same range of width and height dimensions with that of the positive plate. The thickness of the composite negative plate is, however, slightly thicker, e.g., 0.8 to 5.5 millimeters, owing to the layers of capacitor electrode material coated on both faces of the negative. The battery electrodes were made by the methods described in the detailed description above.

In the following, unless stated otherwise, the carbon black used had a specific surface area of 250 m$^2$ g (CABOT, USA), and the activated carbon had specific surface area of 2500 m$^2$ g$^{-1}$ (Kurarekemikaru Co. Ltd. Japan).

For the construction of the composite negative electrode (1), the core structure was that of a lead negative battery electrode, and this was constructed from the material and using the techniques described fully described in PCT/AU2003/001404, the entire contents of which are incorporated by reference. The paste composition for the lead negative electrode comprised lead oxide (1 kg), fibre 0.6 to 1 g, BaSO$_4$ 3.7 to 5 g, vanisperse 3.7 to 5 g, carbon black 0.26 to 12 g, H$_2$SO$_4$ (1.400 rel.dens.) 57 to 80 cm$^3$, water 110 to 126 cm$^3$, acid to oxide ratio 4 to 5.5% and paste density 4.3 to 4.7 g/cm$^3$.

The composition of the capacitor paste material consisted of 45% carbon black, 35% activated carbon, 5% carbon fibre, 2% carboxymethylcellulose and 13% neoprene.

The application of capacitor material on both faces of the lead negative plate can be done in three following ways:
 (i) apply the capacitor paste material (4) on both faces of the pasted lead negative plate (3) and then subject the composite pasted negative plate to curing, drying and formation;
 (ii) apply the capacitor paste material (4) on both faces of cured and dried lead negative plate (3) and then subject to drying and subsequent formation;
 (iii) apply the capacitor paste material on both faces of formed lead negative plate and subject to drying.

The paste composition for the lead dioxide-based positive electrodes (5) consisted of lead oxide 1 kg, fibre 0.5 to 1.0 g, H$_2$SO$_4$ (1.400 rel.dens.) 65 to 95 cm$^3$, water 100 to 140 cm$^3$, acid to oxide ratio 4.0 to 6.6% and paste density 4.0 to 4.5 g/cm$^3$. The lead oxide of the positive electrode material was converted into lead dioxide by standard formation techniques.

Separators (6) were located between the adjacent electrodes. These can be absorptive glass microfibre (AGM) or microporous polypropylene separator.

In this reference example 1, the positive and negative plates have the same width and height dimensions of 76 millimeters, but different thickness. The thickness of the positive plate is 1.6 millimeters, but that of the composite negative plate is 2.3 millimeters. The negative capacitor material was coated on both side of the formed negative plate. Four positives and five negatives together with eight AGM separators were assembled into a cell case (7) as valve-regulated design. With this design, all filling acid solution (8) was absorbed by the plate materials and the separators. The positive electrodes were connected to a positive busbar (9), and the negative electrodes connected to a negative busbar (10). The 5-h capacity of the cell is about 8 Ah. For testing purposes, a charging and discharging profile (line 11) was adopted to simulate the combined high-speed and hill ascending/descending driving conditions of the hybrid electric vehicle (HEV). The profile is composed of discharge and charge parts as shown in FIG. 3. There are three levels of discharge current in the profile:
 (i) the highest level is to simulate the acceleration of the HEV, dash line 12;
 (ii) the medium level is to simulate the high-speed driving of the HEV, dash line 13;
 (iii) the lowest level is to simulate low-speed or cruise driving of the HEV, dash line 14.

There are also two levels of charging current in the profile:
 (i) the highest level is to simulate the charging from regenerative braking of the HEV, dash line 15;
 (ii) the lowest level is to simulate the engine charge of the HEV, dash line 16.

Under each above profile, the 8-Ah cell requires to discharge down to 45% depth-of-discharge (line 17).

Testing

Two control cells were made from positive plate without additives and negative plate without capacitor material coating. Three "high-performance cells" were made from positive plate without additives, but the negative plate with capacitor material coated on both faces. Two control cells and three high-performance cells were subjected repetitively to the above profile until the cell voltage reached or close to 0V.

Figure 4:
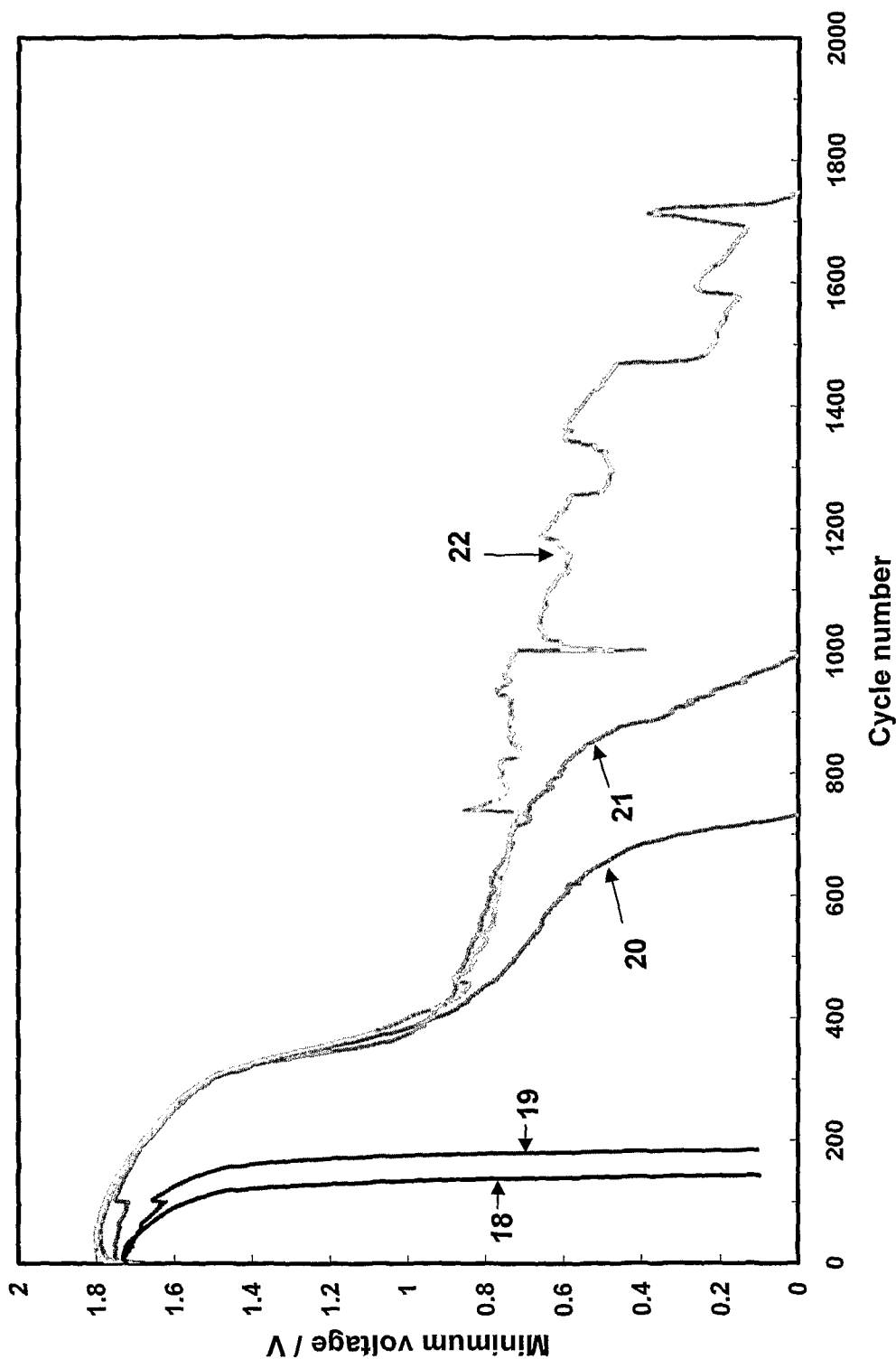
FIG. 4 is a graph of the changes in minimum voltages of two control cells and three high-performance cells when constructed as shown in FIGS. 1 and 2 and cycled under the profile illustrated in FIG. 3.

Furthermore, during charging period of the profile, no limitation of top-of-charge voltage was set. The test results are shown in FIG. 4.

Figure 5:
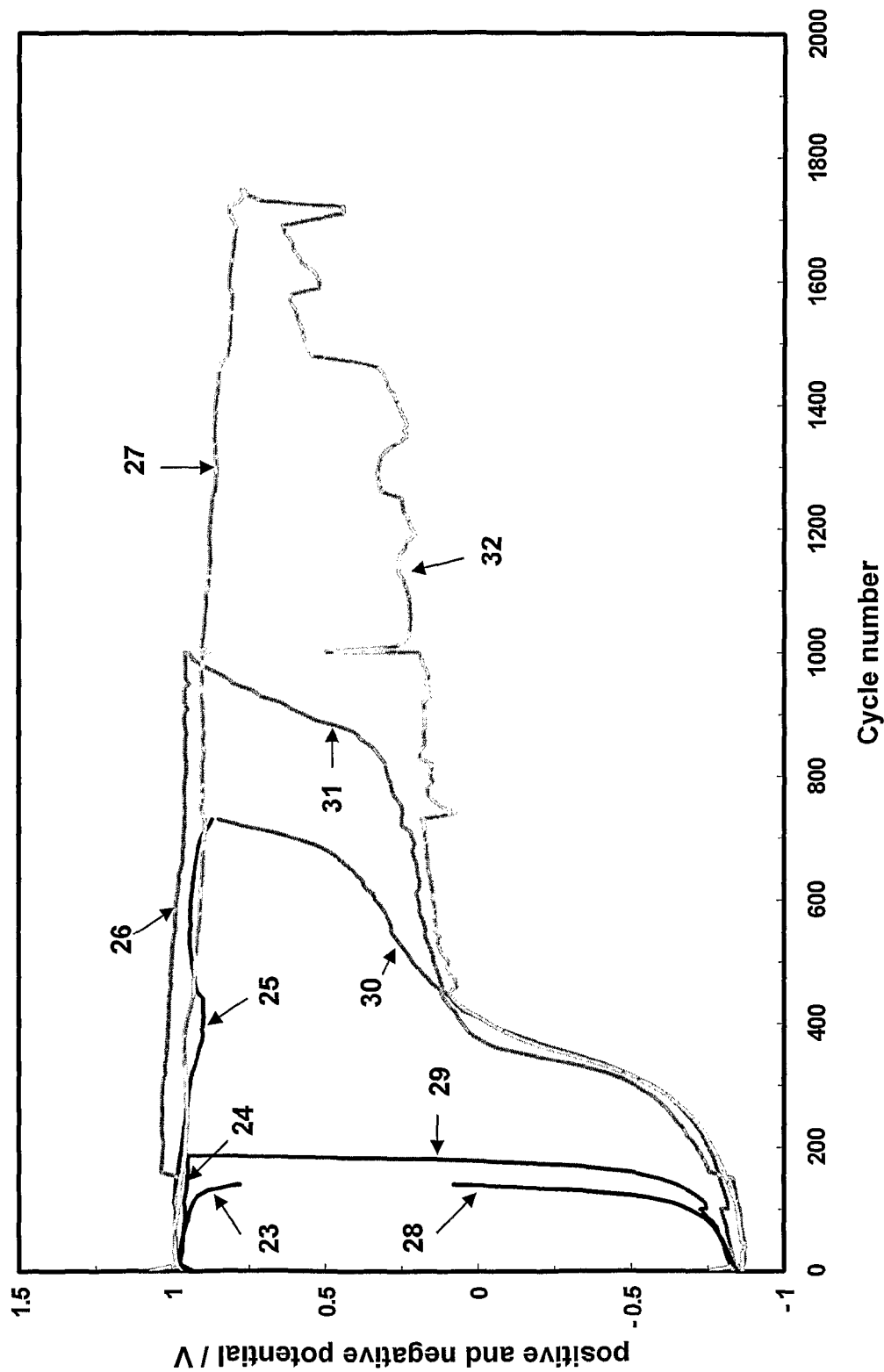
FIG. 5 is a graph of the changes in positive- and negative-plate potentials of two control cells and three high-performance cells when constructed as shown in FIGS. 1 and 2 and cycled under the profile illustrated in FIG. 3.

The two control cells failed after 150 and 180 cycles, respectively, as indicated by the curves 18 and 19, while the high-performance cells failed after 720, 1000 and 1750 cycles, as indicated by the curves 20, 21 and 22. The results shows that the high-performance cells give at least four times longer in cycle life than the control cells. The changes in positive and negative potential during cycling under the combined high-speed and hill-ascending/descending profile are shown in FIG. 5. It can be seen that there are little changes in the positive-plate potentials (curves 23 and 24 for control cells and curves 25, 26 and 27 for high-performance cells) regardless to the cell types, while there are significant changes in the negative-plate potentials (curves 28 and 29 for control cells and curves 30, 31 and 32 for high-performance cells). The negative-plate potentials increase from −1 V to values close to +1 V and the changing behavior of the negative-plate potential of each cell follows its corresponding of the cell voltage. This indicates that the cell failure under such profile is due to the performance of the negative plates. Since the high-performance cells were constructed using negative plates coated with capacitor material, the long cycle lives of these cells are understandable.

Reference Example 2

Figure 6:
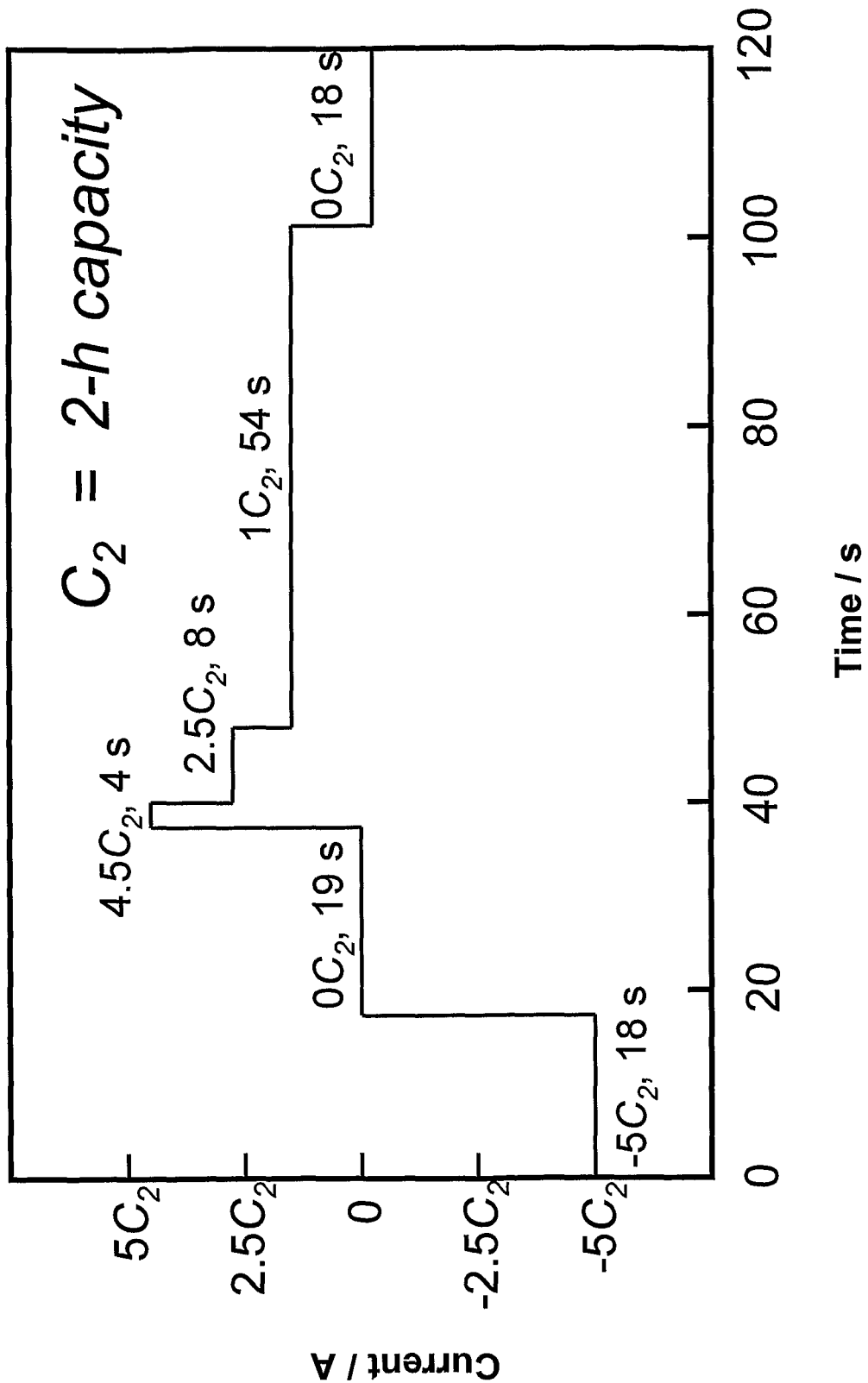
FIG. 6 is a graph of the profile used to simulate the urban driving conditions of a hybrid electric vehicle.
Figure 7:
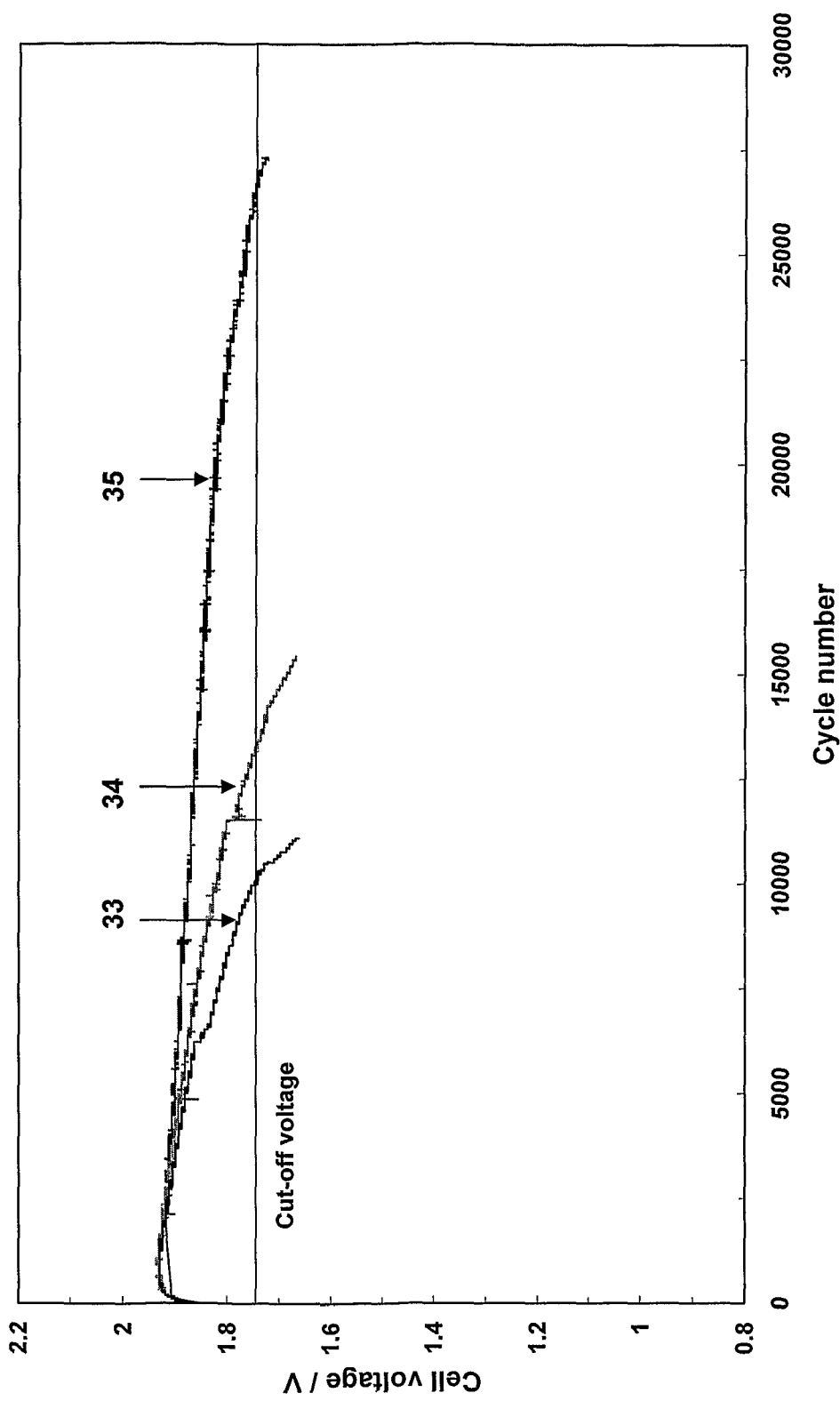
FIG. 7 is a graph of the changes in end-of-discharge voltages of two control cells and one high-performance cell when constructed as shown in FIGS. 1 and 2 and cycled under the profile illustrated in FIG. 6.
Figure 8:
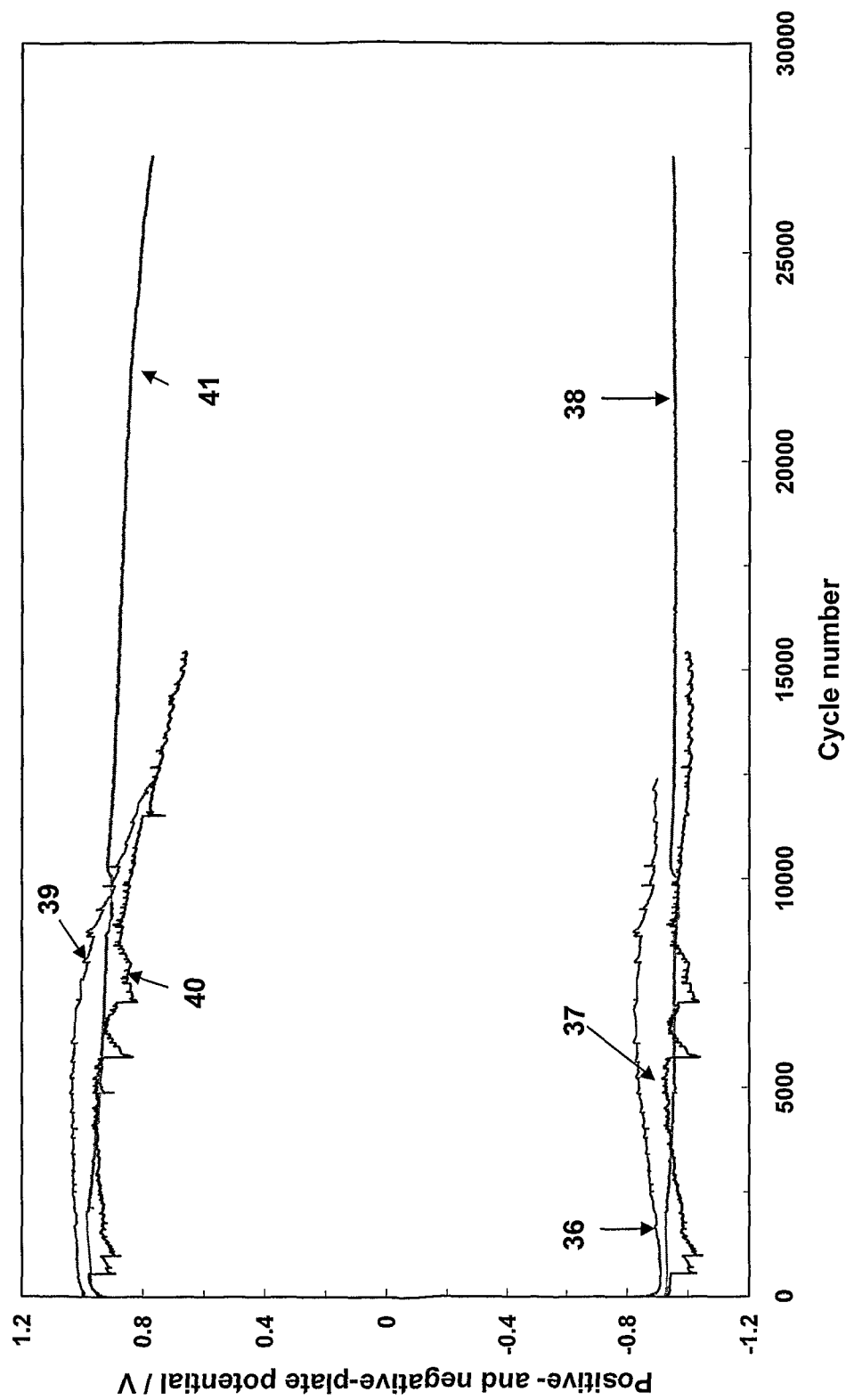
FIG. 8 is a graph of the changes in positive- and negative-plate potentials of two control cells and one high-performance cell when the latter is constructed as shown in FIGS. 1 and 2 and cycled under the profile illustrated in FIG. 6.

Three cells were used for this example and were made from positive and negative plates with the same width and height dimension, namely, 102 and 107 millimeters, respectively. The thickness of positive plates in each cell was similar, namely, 1.45 millimeters, but that of the negative plate was different. Each cell composed of four positives and five negatives. Two cells were control cells (no additive in positive material and no capacitor material coating on negative plates) and had the negative-plate thickness of 1.35 millimeters. One cell was "high-performance cell" (no additive in positive material, but with capacitor material coated on both faces of the negative plates) and had the negative-plate thickness of 1.6 millimeters. Each cell had a 2-h capacity of 25 Ah. The profile used to evaluate these cells are shown in FIG. 6. This profile is used to simulate the urban driving conditions of HEV and composes of one discharge-current step and three charge-current steps. The amplitude of each current step is equal to a multiple of the 2-h capacity ($C_2$), namely, $5C_2$ for the discharge current and $4.5C_2$, $2.5C_2$ and $1C_2$ for the charge currents. Initially, the cells were discharged at 2-h capacity rate to 60% SoC and then subjected repetitively to the above profile at 40° C. until the voltage of each cell reached the cut-off value of 1.75 V. The test results are shown in FIG. 7. The two control cells reached the cut-off voltage of 1.75 V after 10000 and 13000 cycles (curves 33 and 34), while the high-performance cell reached the same voltage after 26000 cycles (curve 35). This performance is at least two times longer in cycle-life than the control counterparts. The changes in negative- and positive-plate potentials of the control cells and high-performance cells during cycling are shown in FIG. 8. There are no major changes in negative-plate potentials of control (curves 36 and 37) and high performance cells (Curve 38) during cycling. Nevertheless, significant changes in positive-plate potential were observed. The positive plate potential decreased with cycling, but the rates of decrease were greater for the control cells (curves 39 and 40) than the high-performance cell (curve 41). This indicates that performance of the cells is limited by the performance of the positive plates. The positive plates could not receive charge effectively during urban driving conditions. Since cell performance under the above profile is limited by the performance of the positive plate, the cycling improvement of the high performance cell is not as great as those cycled under high-speed and hill-ascending/descending profile (negative-plate performance limited). It was indentified that in order to further enhance the cycling performance of "high-performance cells" under urban driving conditions, the positive plate had to be improved.

Example 3

Figure 9:
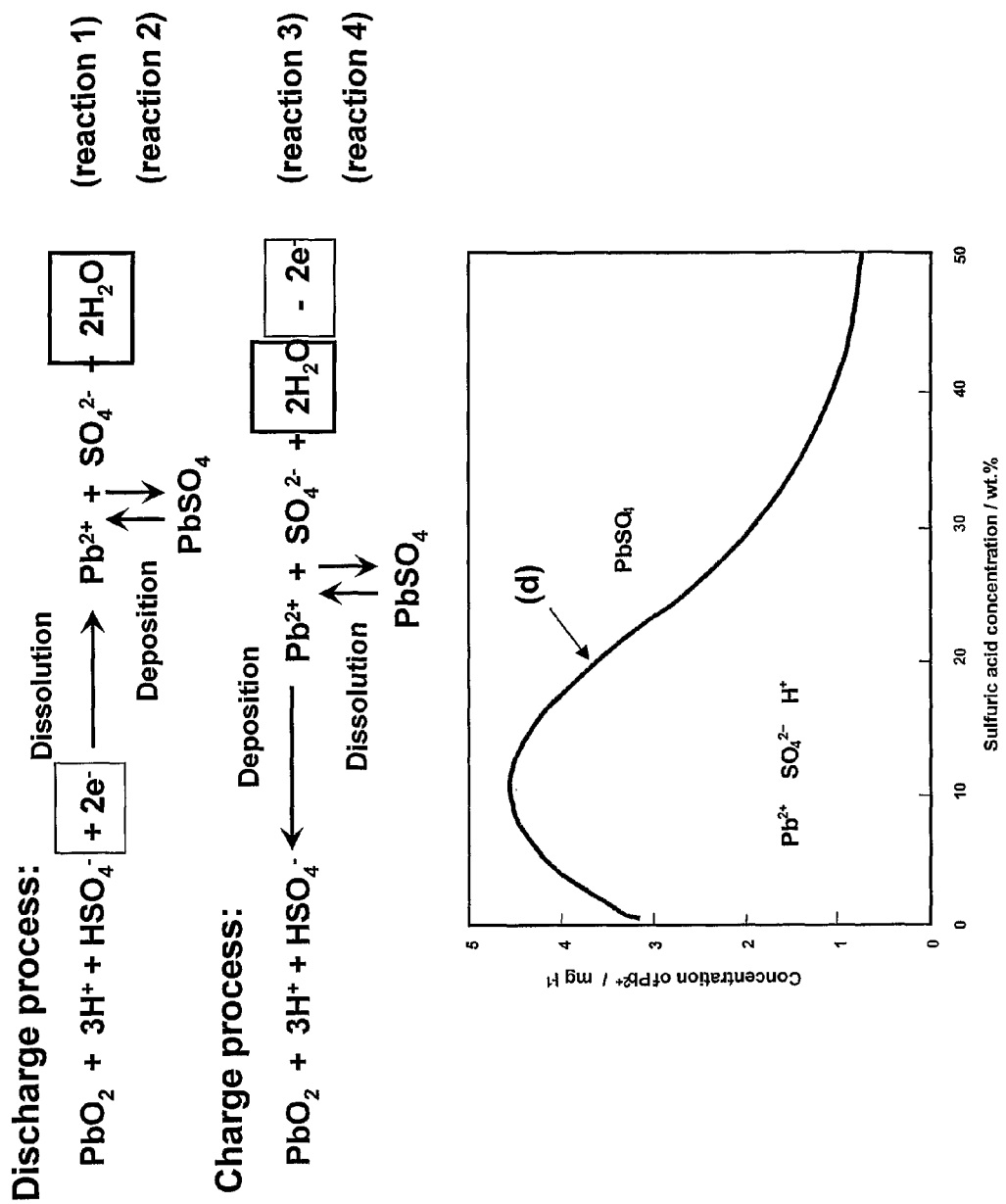
FIG. 9 is a graph of sulphuric acid concentrations against $Pb^{2+}$ concentration for the electrochemical reactions occurring during battery discharge and charge.

The discharge and charge processes of a positive plate and the dissolution of lead sulfate at different concentration of sulfuric acid solution are shown below and are represented in FIG. 9.

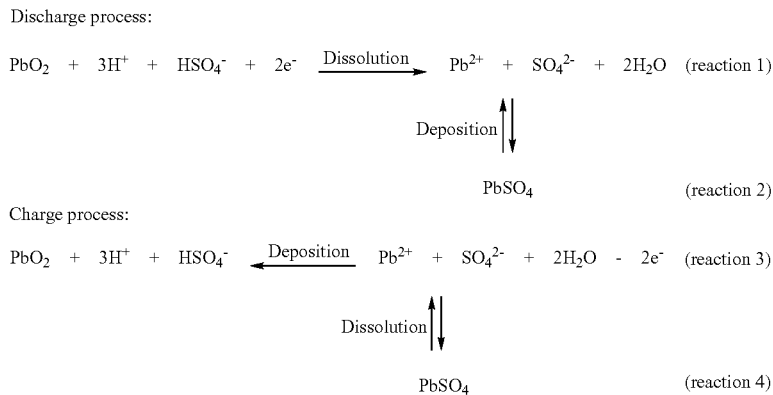

Discharge process:

$$PbO_2 + 3H^+ + HSO_4^- + 2e^- \xrightarrow{\text{Dissolution}} Pb^{2+} + SO_4^{2-} + 2H_2O \quad \text{(reaction 1)}$$

$$\text{Deposition} \updownarrow$$

$$PbSO_4 \quad \text{(reaction 2)}$$

Charge process:

$$PbO_2 + 3H^+ + HSO_4^- \xleftarrow{\text{Deposition}} Pb^{2+} + SO_4^{2-} + 2H_2O - 2e^- \quad \text{(reaction 3)}$$

$$\text{Dissolution} \updownarrow$$

$$PbSO_4 \quad \text{(reaction 4)}$$

During discharge, the conversion of lead dioxide to lead sulfate proceeds via two steps. First, the lead dioxide at the positive plate reacts with $HSO_4^-$ and $H^+$ to form $Pb^{2+}$, $SO_4^{2-}$ and $H_2O$, i.e., the so-called 'dissolution process' (reaction 1). Then, the $Pb^{2+}$ combines with $SO_4^{2-}$ to form $PbSO_4$, i.e., the so-called 'deposition process' or 'precipitation process' (reaction 2). The first step is an electrochemical reaction and thus involves electron movement and transfer. The electrons pass from the counter negative plate into the positive plate and move to the reactive sites (i.e., lead dioxide) where the electron transfer takes place. The movement of electrons in the positive material occurs through the conductive pathways. This requires more conductive pathways in the positive material matrix. Otherwise, the potential of the positive plate will be dropped due to resistance effect. The rate of the electrochemical reaction is therefore dependent on the movement of electron, the diffusion of $HSO_4^-$ species and the effective surface-area of the lead dioxide. On the other hand, the second step is a chemical reaction and proceeds at a rate which is acid-dependent. The solubility of lead sulfate does not increase with increase in sulfuric acid concentration. Rather, it reaches a maximum value at a concentration of 10 wt. % sulfuric acid (1.07 rel.dens.), and then decreases rapidly with further increase in concentration (FIG. 9, curve (d)). Thus, the $Pb^{2+}$ will precipitate as lead sulfate at concentrations above the solubility curve. For a given concentration of $Pb^{2+}$ above ~1 mg $l^{-1}$, the deposition (or precipitation) of $Pb^{2+}$ to lead sulfate will be faster at plate locations which experience high concentrations of acid.

After discharge, the concentration of acid solution decreases because the conversion of lead dioxide to lead sulphate consumes sulfuric acid.

During charging, the conversion of lead sulfate to lead dioxide also proceeds via two reactions, namely, dissolution (reaction 4) and deposition (reaction 3). Nevertheless, the nature of these reactions differs from that of the corresponding discharge reactions. Dissolution is now the chemical reaction, while the subsequent deposition is the electrochemical reaction. The lead sulfate first dissociates to $Pb^{2+}$ and $SO_4^{2-}$ ions (reaction 4). The $Pb^{2+}$ then gives out two electrons and reduces to lead dioxide under the presence of $H_2O$ (reaction 3). Simultaneously, $SO_4^{2-}$ combines with $H^+$ to form $HSO_4^-$. The electrons flow from the reactive sites (i.e., lead sulphate) via the conductive pathways in the positive-plate material to the grid members and then to the counter negative plate. In addition to the oxidation of $Pb^{2+}$ to lead dioxide, there is the competing reaction of oxygen evolution. After charge, the concentration of sulphuric acid solution increases because the conversion of lead sulphate to lead dioxide consumes water.

From the above discussion, in order to increase the charging ability of the positive plate, the following was proposed:
(i) After discharge, the concentration of sulphuric acid solution in the interior of the positive plate should be deceased to a low value around 5-20 wt % (around 10 wt %) in order to promote the dissociation of lead sulphate to $Pb^{2+}$ and $SO_4^{-2}$ for the subsequent charge process. The specific gravity for these concentrations is about 1.03-1.16 g/cm$^3$. The method to reduce the concentration of sulphuric acid solution to a low value after discharge is to use less volume of acid solution in the positive plate. This can be achieved by using positive plate made from high paste density (i.e. 4.4-4.7 g/cm$^3$). This is because increasing the paste density will reduce the porosity of the plate material and, thereby, decrease the pore volume for retaining the acid solution. Furthermore, the positive plate with high paste density (e.g., less porosity) will slow down the diffusion of the sulphuric acid from the bulk of the solution to the interior of the plate.
(ii) The charge process requires the smooth movement of electrons inside the positive material matrix. Thus, addition of the conductive materials will develop more conductive pathways inside the positive material.
(iii) Since oxygen evolution is the competing reaction to the conversion of lead dioxide toward the end of charge process, oxygen-suppressing additives should be added to the positive material.

In summary, in order to improve the charging ability of the positive plate of the lead-acid battery, the plate (positive battery electrode) should be made from positive material containing conductive additives which increase the charging ability of the electrode, and preferably also with a high paste density and oxygen-suppressing additive(s).

Reference Example 4

Figure 10:
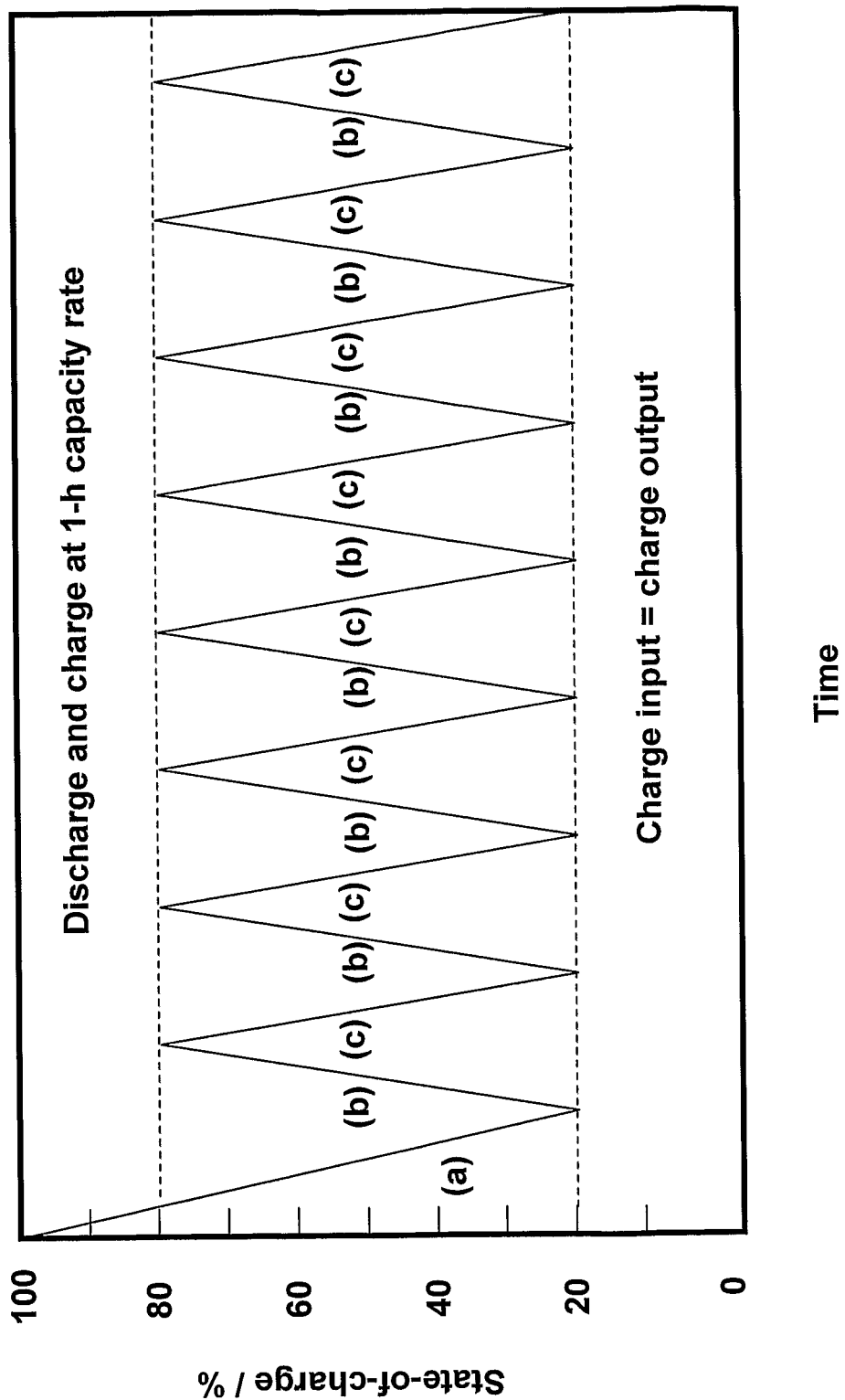
FIG. 10 is a graph of the developed profile used to evaluate the effects of additives on charging ability of the positive plates.

A simplified charge and discharge profile was developed to evaluate the charging ability of the positive plate without or with additives in FIG. 10. The profile includes:
(a) Discharge the full-charge cell to 20% State-of-charge (SoC) at 1-h capacity rate;
(b) Recharge the cell to 80% SoC at 1-h capacity rate;
(c) Discharge the cell to 20% SoC at 1-h capacity rate;
(d) Repeat steps (b) and (c) until the cell voltage or the positive-plate potential reach 1.67 or 0.75 V, respectively.

The charge input and output of the cell during steps (b) and (c) are kept equally.

Testing

Figure 11:
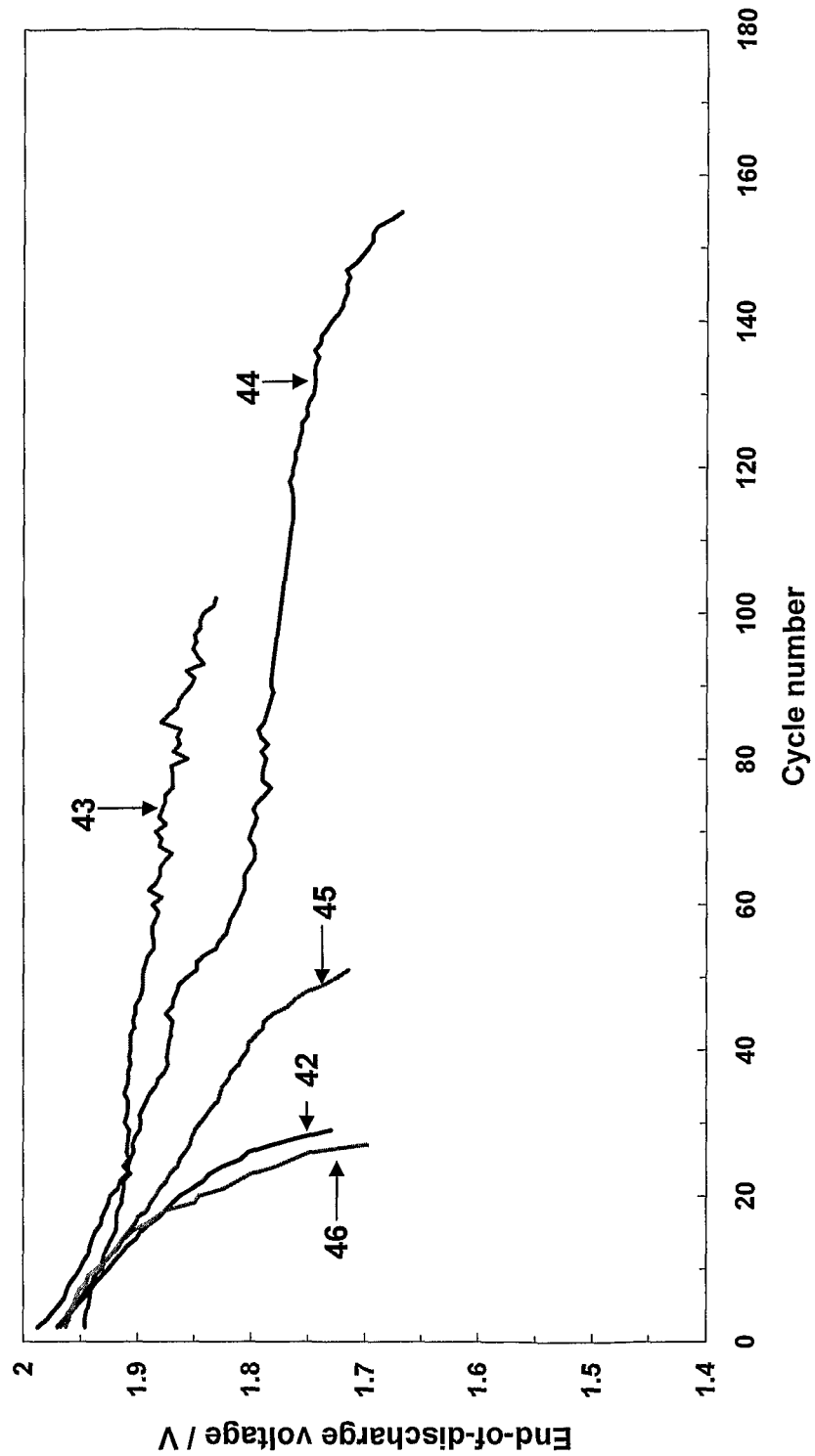
FIG. 11 is a graph of the changes in the end-of-discharge voltages of one control cell and cells using positive plates doped with carbon nanotubes at different levels when cycled under profile illustrated in FIG. 10.
Figure 12:
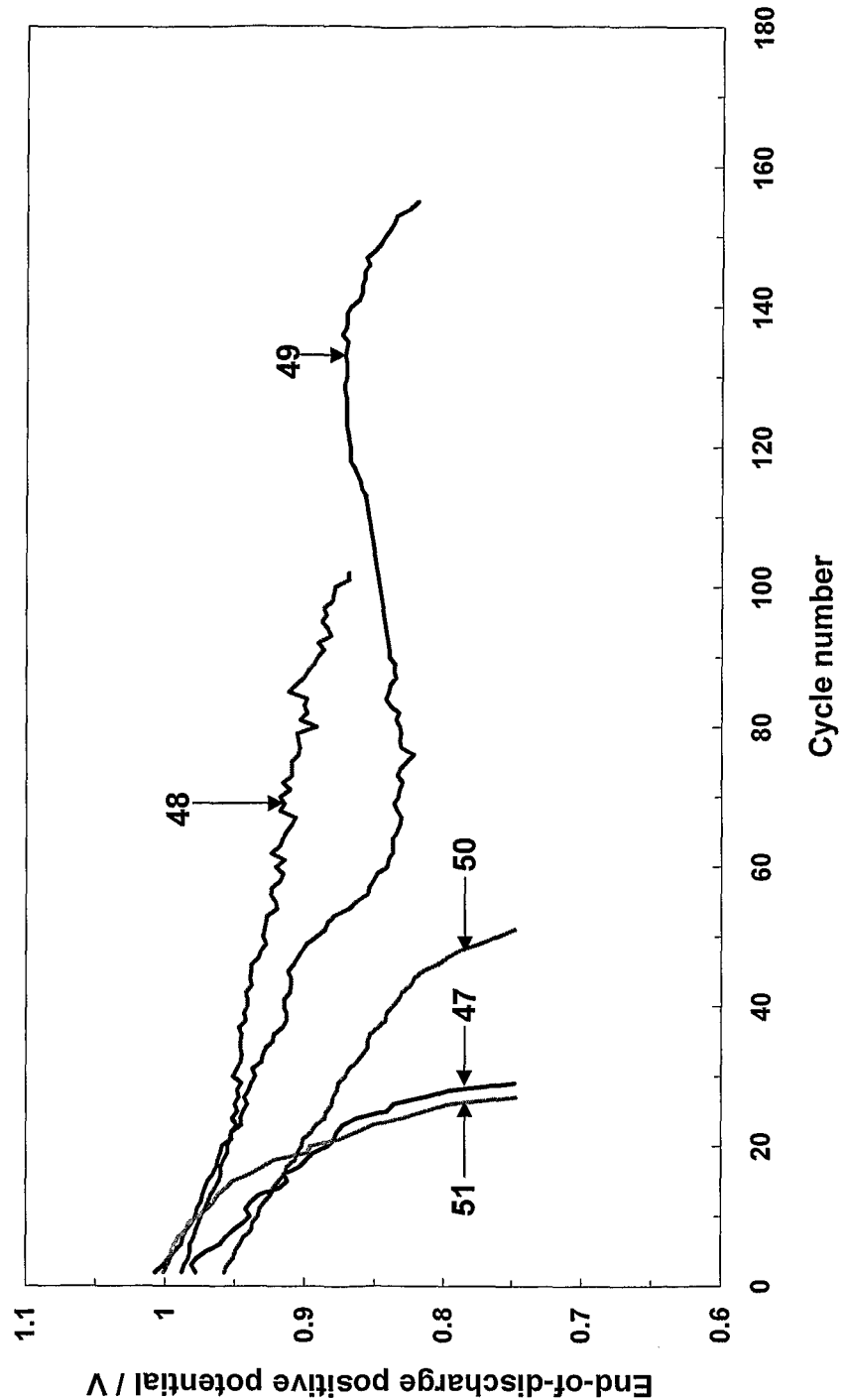
FIG. 12 is a graph of the changes in the end-of-discharge positive potentials of one control cell and cells using positive plates doped with carbon nanotubes at different levels when cycled under profile illustrated in FIG. 10.

Five, three-plate cells (one positive and two negatives) were constructed as flooded design using microporous polypropylene separators. Furthermore, the total negative material in each cell is more than the positive material and, therefore, the cell performance is expected to be limited by the positive-plate performance. With such cell configuration, it is possible to examine the effects of additives on the performance of positive plate when added to the positive material. The positive and negative plates have the same width and height dimensions of 76 millimeters, have different thicknesses i.e., 1.45 millimeters for positive plate and 1.35 millimeters for negative plate. One of the cells was made from undoped positive plate (control cell) and the remaining cells were made from positive plate doped with carbon nanotubes at 0.25, 0.5, 1.0 and 1.5 wt. %. The negative plates of all cells in this example were lead negative plate without capacitor material coating. The cells were subjected repetitively to the above profile at ambient temperature (21° C.). The test results are shown in FIG. 11. It is clear that the cell performance increases in the order: cell with 1.5% carbon nanotubes (curve 46)<control cell (curve 42)<cell with 1% carbon nanotubes (curve 45)<cell with 0.5% carbon nanotubes≈cell with 0.25% carbon nanotubes. Note the cell with 0.25% carbon nanotubes completed at 160 cycles, but the date was lost after 103 cycles due to the malfunction of the data logging system. The changes in positive-plate potentials of all types of cells are also shown in FIG. 12. The change in positive-plate potentials of each cell (i.e., curve 51 for cell with 1.5% carbon nanotubes, curve 47 for control cell, curve 50 for cell with 1.0% carbon nanotubes, curve 49 for cell with 0.5% carbon nanotubes and curve 48 for cell with 0.25% carbon nanotubes) follows the trend of its corresponding cell voltage. This indicates that the performance of all cells is limited by that of their positive plates.

From the above performance results, the question may be asked 'why does the performance of positive plate decrease when more conductive material (carbon nanotubes) is added'. We have determined that reason is the carbon nanotube is a porous material. When the content of this material was increased to a certain value, the positive paste density reduced. Consequently, the volume of the acid solution in the positive material increased and as mentioned in the Example 3, the concentration of sulfuric acid solution in the interior of plate after discharge was still at high value. This would slow down the dissociation of lead sulfate to $Pb^{2+}$ and $SO_4^{2-}$.

Furthermore, the decrease in paste density would reduce the connectivity of the individual particles in the material matrix.

Example 5

Figure 13:
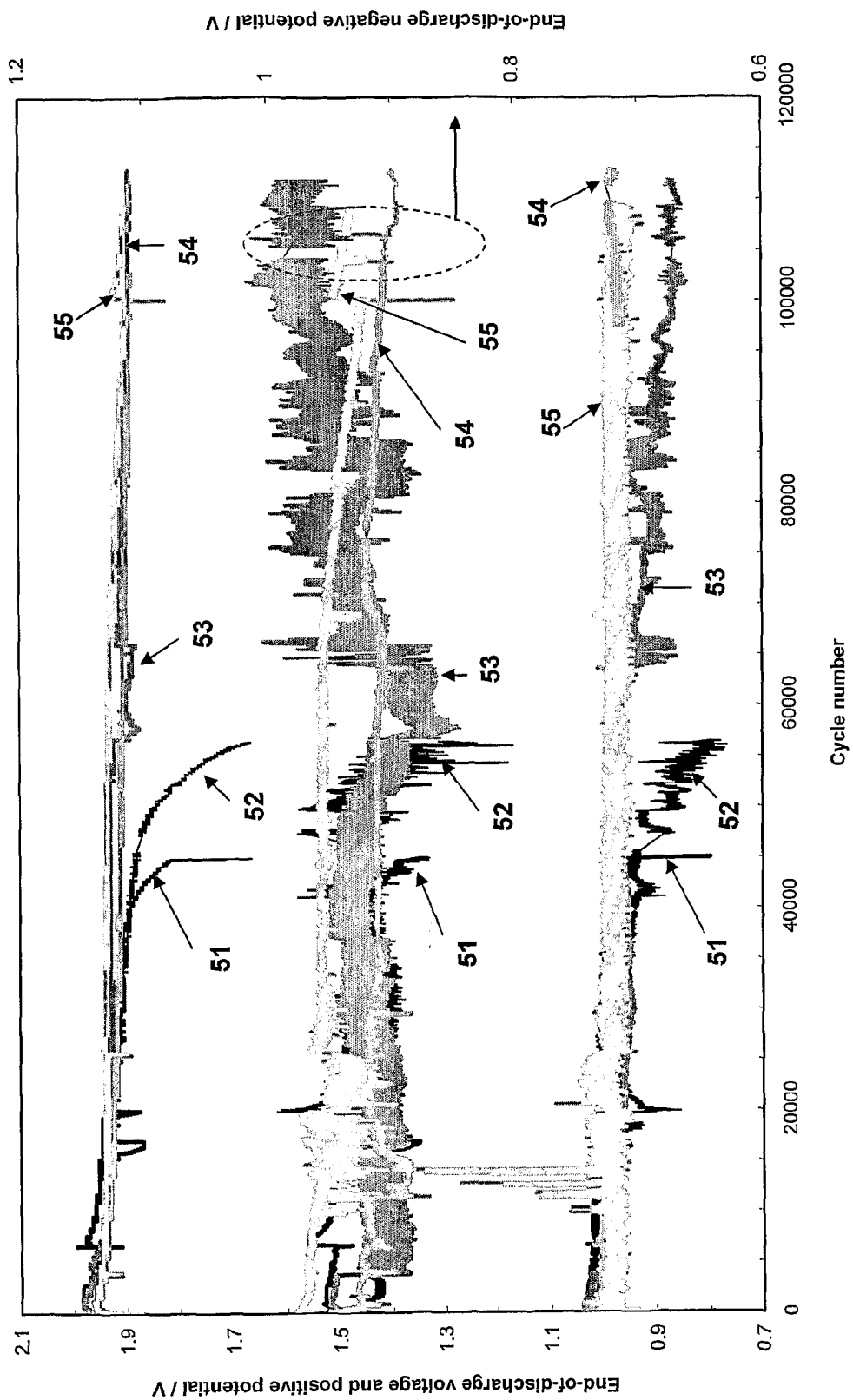
FIG. 13 is a graph of the changes in end-of-discharge voltages, positive- and negative-plate potentials of one control cell and high-performance cells using positive plates doped with different additives at different levels when constructed as shown in FIGS. 1 and 2 and cycled under the profile illustrated in FIG. 6.

The profile used in this example is similar to that in reference example 2, FIG. 6. Five cells were constructed using positive and negative plates with the same width and height dimensions, (i.e., 44 millimeters for the width and 71 millimeters for the height), but with different thicknesses, density as well as additives to the positive material. The cells were subjected to the same test procedure described in reference example 2. The test results are shown in FIG. 13. The conditions applying to each cell (i.e. plate thickness, density, additives) and performance are as follows:

(i) Control cell as indicated by curves 51 with positive-plate thickness of 1.55 millimeters, paste density of 4.0 g cm$^{-3}$, no additive; negative-plate thickness of 1.65 millimeters, paste density of 4.1 g cm$^{-3}$, no capacitor material coating. This cell completed 45000 cycles and failed because of the performance of positive plates.

(ii) Cell as indicated by curve 52 with positive-plate thickness of 1.55 millimeters, paste density of 4.5 g cm$^{-3}$, no additive; negative-plate thickness of 1.65 millimeters, paste density of 4.1 g cm$^{-3}$, no capacitor material coating. This cell completed 56000 cycles and failed because of the performance of positive plates.

(iii) Cell as indicated by curve 53 with positive-plate thickness of 1.55 millimeters, paste density of 4.0 g cm$^{-3}$, with addition of 0.5% carbon nanotubes; negative-plate thickness of 2.4 millimeters, paste density of 4.1 g cm$^{-3}$ and coated with negative capacitor material. This cell cycled up to 113000 cycles, and was still in a healthy condition.

(iv) Cell as indicated by curve 54 with positive-plate thickness of 1.65 millimeters, paste density of 4.0 g cm$^{-3}$, with addition of 2% tin dioxide coated glass flakes; negative-plate thickness of 2.4 millimeters, paste density of 4.1 g cm$^{-3}$ and coated with negative capacitor material. This cell cycled up to 116000 cycles, and was still in a healthy condition.

(v) Cell as indicated by curve 55 with positive-plate thickness of 1.65 millimeters, paste density of 4.0 g cm$^{-3}$, with addition of 1% positive capacitor material; negative-plate thickness of 2.4 millimeters, paste density of 4.1 g cm$^{-3}$ and coated with negative capacitor material coating. This cell cycled up to 110000 cycles, and was still in a healthy condition.

Example 6

Figure 14:
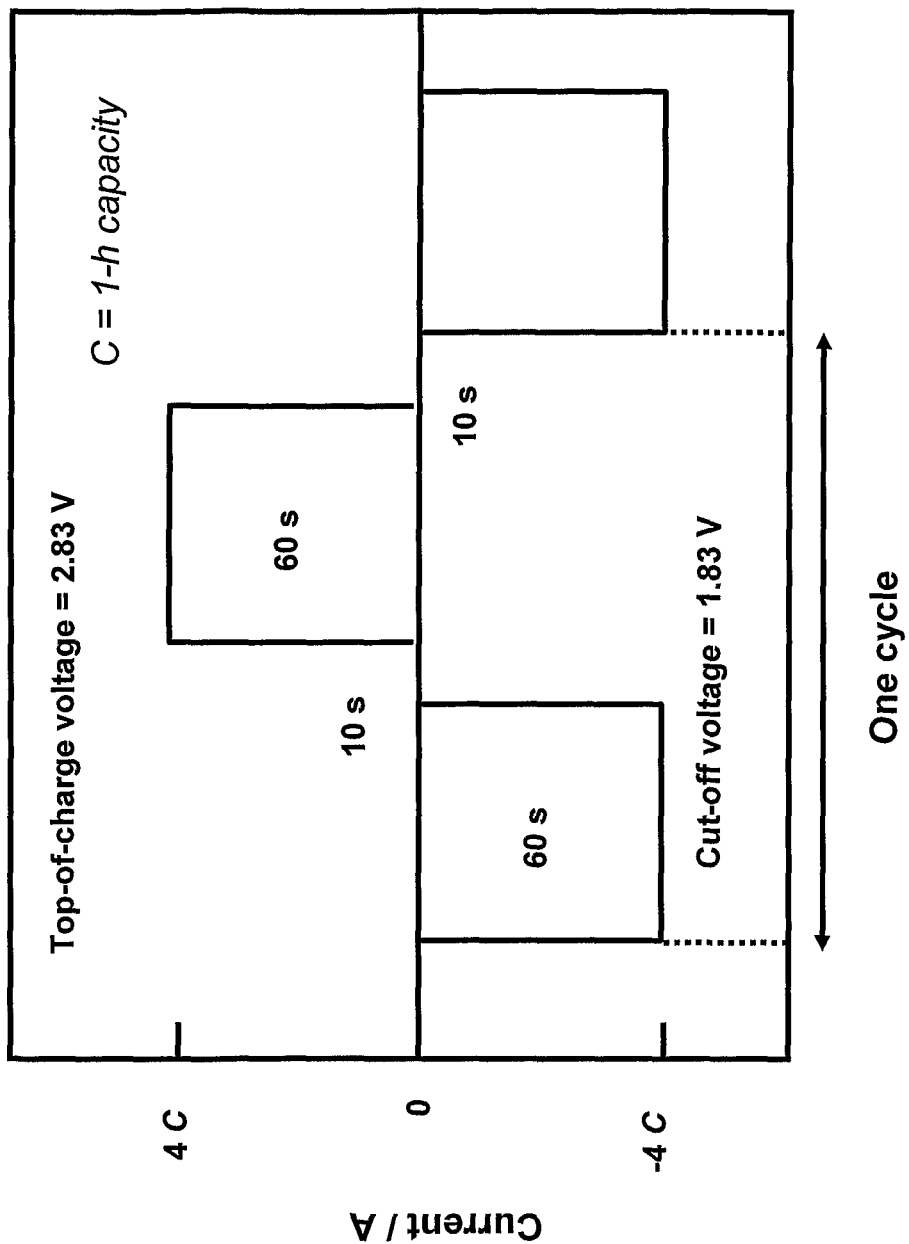
FIG. 14 is a graph of the profile used to simulate the driving conditions of the hybrid buses and trucks.

The profile used in this example is the simplified discharge and charge profile used to simulate the driving conditions of the hybrid buses and trucks, FIG. 14. The profile composes of a discharge at 4 C A for 60 s and a charge at 4 C A for 60 s. There are two rest times of 10 s each in between discharge and charge or charge and discharge pulses. Initially, the full-charge cell was discharged to 50% SoC and then subjected to this profile repetitively until the cell voltage reached 1.83 V. The test would also be terminated when the voltage reached 2.83 V during charging part of the profile.

The cells used for the above test were made from 4 positives and 5 negatives. The positive and negative plates have the same width and height dimensions of 76 millimeters, have different thicknesses, i.e., 1.6 millimeters for positive plate and 2.3 millimeters for negative plate. Furthermore, all the cells were made from the same composition of composite negative plates, but with different additives in positive-plate material. The cell conditions and cycling performance are shown in Table 1.

TABLE 1

Effects of additives on the cell performance.

| Cell type | Additives in positive material | Cycling performance (cycles) |
|---|---|---|
| R-1 | Nil | 1656 |
| R-2 | 0.25 wt. % graphite | 1600 |
| R-3 | 0.5 wt. % graphite | 1850 |
| R-4 | 1.0 wt. % graphite | 1750 |
| R-5 | 1 wt. % capacitor material | 1654 |
| R-6 | 1.5 wt. % capacitor material | 1365 |
| R-7 | 2.0 wt. % capacitor material | 1155 |
| A-1 | 0.1 wt. % Fullerene | 2319 |
| A-2 | 0.25 wt. % Fullerene | 2282 |
| A-3 | 0.1 wt. % carbon nanotube | 1970 |
| A-4 | 0.25 wt. % carbon nanotube | 2797 |
| A-5 | 0.50 wt. % carbon nanotube | 2207 |
| A-6 | 0.75 wt. % carbon nanotube | 1896* |
| A-7 | 0.25 wt. % vapour grown carbon fibre | 2724 |
| A-8 | 0.5 wt. % vapour grown carbon fibre | 2486 |

Desirably, the cycling performance increase needs to be at least 10%, generally at least 15%, greater than the nil reference. Graphite and capacitor material do not reach the level, and/or the performance drops off with greater addition. In contrast, this level is reached with the appropriate selection of the additive and amount. *It is noted that the performance for carbon nanotube drops off due to the reasons stated in the last paragraph under Reference Example 4.

The following are the examples of different battery configuration.

Example 7

Figure 15:
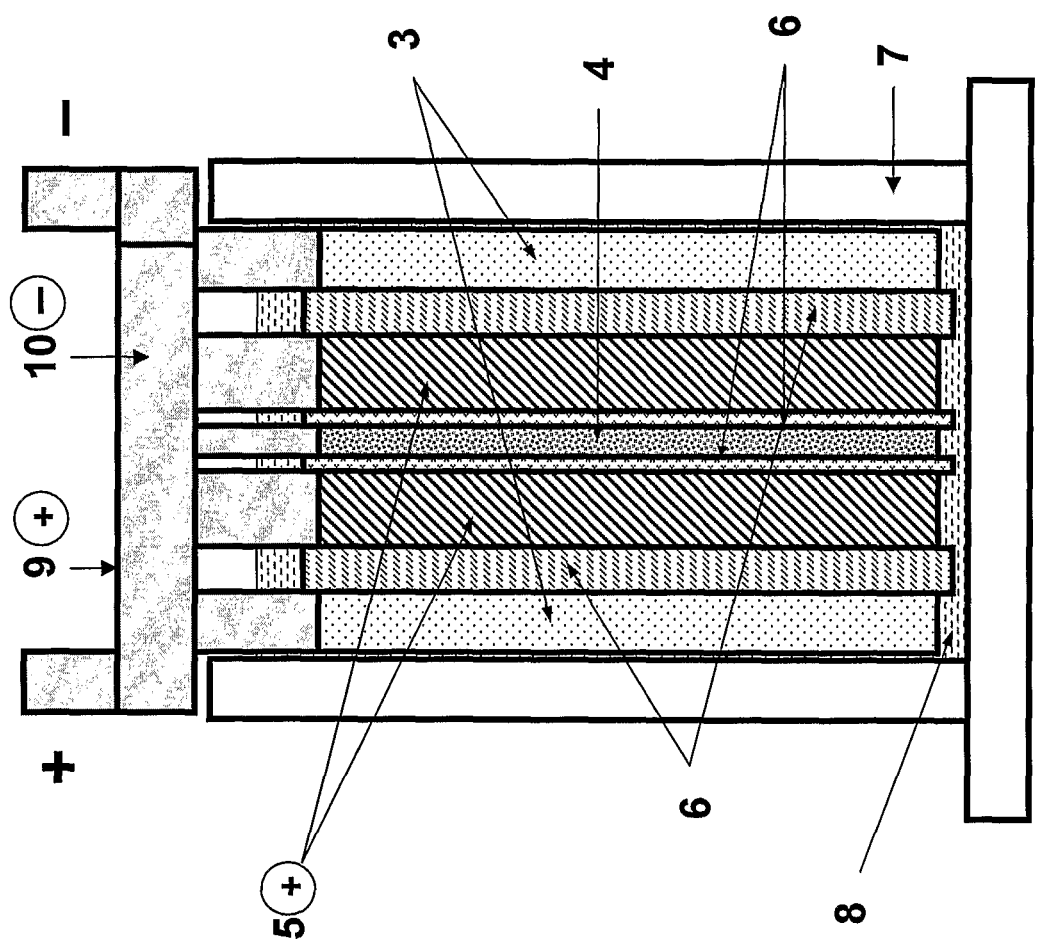
FIGS. 15 and 16 are a schematic side view and a schematic top view of a lead-acid energy storage device in accordance with a second embodiment of the invention.

A further variation on the battery configuration of Example 1 is illustrated in FIG. 15. For ease of comparison, the same numerals are used to refer to common features of the two batteries.

Figure 16:
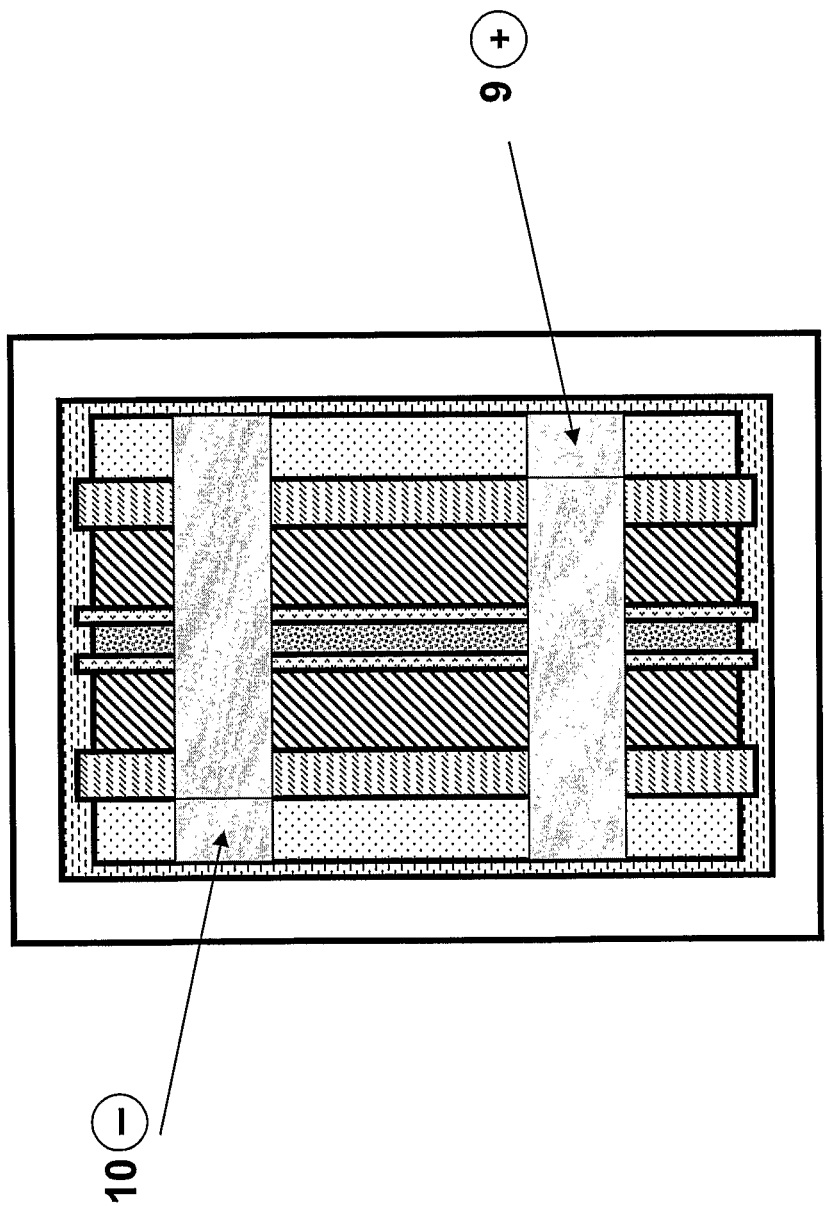

The battery of this Example comprises an alternating series of positive and negative electrodes. The electrodes are, in order from left to right, a lead-based battery negative electrode (3), a lead dioxide battery positive electrode (5), a negative capacitor material electrode (4), a second lead dioxide battery positive electrode (5), a second lead-based battery negative electrode (3). Each of the positive is connected to a positive conductor and the negative capacitor material electrode and the lead negatives are connected a negative conductor. Each positive and negative conductors, respectively, are connected to the positive and negative terminals of the battery. The top view of this assembly is shown in FIG. 16.

Example 8

A variation on the battery of Example 1 is illustrated in FIGS. 17 and 18. For ease of comparison, the same numerals are used to refer to common features of the two batteries.

The embodiment of this Example comprises three lead dioxide positive plate electrodes (5) and two composite negative electrodes (1). The composite negative electrodes comprise a current collector or grid (2) with the lead-containing paste composition described above applied to one side a current collector or grid (2) thereof (2) and capacitor high surface-area carbon material paste (4) applied onto the other side of the grid. With this configuration, the thickness of the lead dioxide positive plate in between two composite negative electrode can be reduced and thereby decrease the battery weight.

Example 9

A variation on the battery of Example 1 is illustrated in FIGS. 19, 20 and 21. For ease of comparison, the same numerals are used to refer to common features of the two batteries.

The embodiment of this Example comprises three lead dioxide positive plate electrodes (5) and two composite negative electrodes (1). The composite negative electrodes comprise a current collector or grid (2) with the lead-containing paste composition described above applied to bottom part of the grid (2) thereof (3) and capacitor high surface-area carbon material paste applied to the upper part of the grid (2) thereof (4). Note, the capacitor high surface-area carbon material not only can be applied to the upper part, but also can be applied to any regions of the grid (2) (e.g., bottom, left-hand side or right-hand side of the grid). Since capacitor material is significantly lighter than the lead negative material, the weight of battery is reduced.

Formation of the electrode is conducted in the manner known in the art. In a variation on this embodiment that is simpler to manufacture, a lead based negative electrode is prepared with lead pasted by conventional techniques to the main body section in lead paste material, and after cured and dried, the capacitor material is applied to the upper region of the grid, followed by formation. The positive (5) and negative composite electrodes (1) are positioned in an alternating arrangement as illustrated in FIG. 19 in a battery case (7).

The positive lead dioxide electrodes (5) and negative composite electrodes (1) of the embodiment illustrated in FIG. 20 can be 20-500 millimeters wide by 20-1200 millimeters high by 0.6-5.0 millimeters thick. The carbon electrode region (4) of the negative electrode can take up 5.0 millimeters of the thickness of the negative electrode.

Separators (6) are located between the adjacent electrodes. Absorptive glass microfibre (AGM) separators (5) of 0.8-5.2 millimeters in thickness are positioned between the lead-dioxide (5) and the negative electrode (1).

The battery case (7) is filled with sulfuric acid solution (8). The positive electrodes are connected to a positive busbar (9), and the negative electrodes connected to a negative busbar (10).

Example 10

Figures 22, 23:
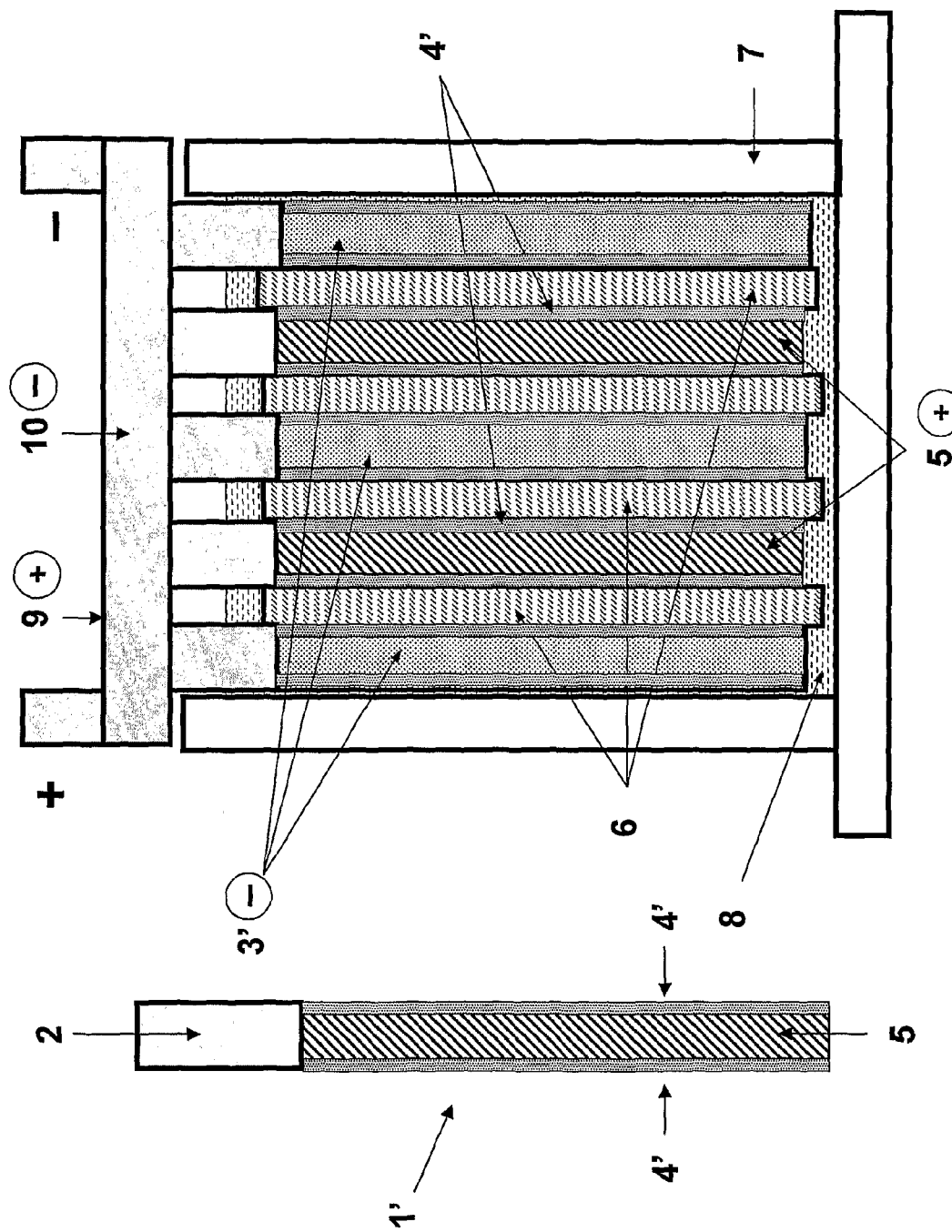
FIG. 22 a schematic side view representing the electrode arrangement of a battery.
FIG. 23 is a schematic side view of one of the positive electrode with both surfaces being coated with capacitor material.

A further variation on battery configuration of example 1 is illustrated in FIGS. 22 and 23. The device includes three composite negative electrodes (3'), which are similar to the composite negative electrode (1) of Example 1, and two positive electrodes (1'). Each positive electrode includes a current collector (2) with battery positive material (5) pasted thereon, and with a coating of capacitor electrode material (4') on each face of either cured or formed positive material, forming the composite positive electrodes. The lead dioxide positive material may or may not contain additives, depending on the experiment.

The positive and negative electrodes were positioned in an alternating arrangement as illustrated in FIG. 22 in a battery case (7). The composite positive electrodes (1', comprising 5 and 4') were of the same range of width and height dimensions as those of the composite negative plate. The thickness of the composite positive plate is in the range between 0.8 to 6.5 millimeters, owing to the layers of capacitor electrode material coated on both faces of the positive. The battery electrodes including capacitor layer were made by the methods described in example 1.

The cells used to validate such battery configuration were made from 4 positives and 5 negatives. The positive and negative plates have the same width and height dimensions of 76 millimeters, have different thicknesses, i.e., 2.0 to 2.5 millimeters for positive plate and 2.3 millimeters for negative plate. Furthermore, all the cells were made from the same composition of composite negative plates, and had an identical positive plate composition except for the addition of different amounts of capacitor material coated on the lead-dioxide positive plates as indicated in Table 2. The cells were subjected to the same profile (FIG. 14) and test procedure as used in Example 6. The cell conditions and cycling performance are shown in Table 2.

TABLE 2

Effects of amount of capacitor material coated on the surface of positive electrode on the cell performance.

| Cell type | Amount of capacitor material coated on the positive plate surface (wt. %)* | Cycling performance (cycles) |
| --- | --- | --- |
| R-1 | Nil | 1656 |
| B-1 | 4 wt. % | 2629 |
| B-2 | 2 wt. % | 3309 |

*weight percentage of capacitor material against the positive electrode material.

Example 11

A variation on battery configuration of Example 10 is illustrated in FIGS. 24 and 25. For ease of comparison, the same numerals are used to refer to common features of the two batteries.

The embodiment of this Example comprises three composite negative electrodes (3) and two composite positive electrodes (1). Each positive electrode includes a current collector (2) with a coating of capacitor electrode material (4'), and with a subsequent layer of battery positive material pasted thereon (5), forming the composite positive electrodes.

During charge and discharge, there are two phenomena that take place at the interface between the current collector (or grid alloy) and the positive material, namely, passage of electrons, and development of corrosion layer.

On the first point, the electrons will flow between the current collector and the positive material during charge and discharge. The passage of the electrons will become quicker (or smoother) if the surface area of the interface is high. It has been found that the coating of the carbon based capacitor material on the current collector aids this.

On the second point, the current collector is at a risk of corrosion in the device. The phase composition of the corrosion product is mainly $PbO_x$ (i.e., x=1 to 2). The corrosion product is a non-conductive lead oxide when x is closer to 1 (i.e. less than 1.5), or is a conductive lead dioxide when x is closer to 2. If the majority of corrosion products are made of lead oxide, the resistance of the positive plate will increase. The number of x is dependent upon the grid alloy composition, acid concentration and the duty under which the batteries are operated. Since the carbon material is harder than the lead alloy, the carbon particles can pin onto the surface of the grid when applying the capacitor material onto the lead alloy grid. It has been found that this will cause the corrosion layer developed during the subsequent cycling to be discontinuous (the corrosion layer cannot develop on the surface of carbon particles), which minimises the level of corrosion and improves performance.

Thus, the advantages of applying the capacitor material on the grid alloy are: (i) to promote the flow of electrons between the grid alloy and the positive material through the increase in the interface surface area, and (ii) to minimize the formation of the continuous corrosion layer surrounding the surface of the grid. Overall, reduces the internal resistance of the positive plate and consequently, the plate is able to handle the further higher discharge and charge rates.

In addition to coating the current collector with capacitor electrode material, the lead dioxide positive material applied on top should contain the charging-ability increasing additive, such as the tin dioxide, carbon nanofibre and/or fullerene to increase the charging efficiency of the composite positive plate.

Example of the preferred composition of the composite negative and positive plates is given in Table 3.

TABLE 3

Preferred composition of the composite positive and negative plates.

| Components | Composite Negative plate | Composite positive plate |
| --- | --- | --- |
| Grid alloys | 0.07 to 0.09 wt. % Ca<br>0.3 to 0.5 wt. % Sn<br>(remaining is Pb)<br>Other alloy materials may be used. | 0.06 to 0.1 wt. % Ca<br>0.3 to 0.6 wt. % Sn<br>0 to 0.01 wt. % Ba<br>(remaining is Pb)<br>Other alloy materials may be used. |
| Capacitor material | 45 wt. % carbon black<br>35 wt. % activated carbon<br>20 wt. % binder<br>The composition can vary as described previously. | 45 wt. % Carbon black<br>35 wt. % activated carbon<br>20 wt. % binder<br>The composition can vary as described previously. |
| Location of capacitor-material layer | Coating on both surface of the battery material layer on the negative plate at total of 4 to 5 wt. % respective to the weight of the negative battery plate material. The broad range permissible is 1-7 wt %. | Coating on the lead - alloy grid at total of about 5 wt. % respective to the weight of positive-plate material. The broad range permissible is between 1-6 wt %. |
| Negative and positive plate material | 92 wt. % PbO (more broadly 90-95% PbO)<br>0.07 wt. % plastic fibre (more broadly 0.05-0.1% plastic)<br>1.4 wt. % BaSO$_4$ (more broadly 1-2% BaSO$_4$)<br>0.3 wt. % Vanisperse (more broadly 0.1-0.6% Vanisperse)<br>1.11 wt. % carbon black (more broadly 0.5-3% carbon black)<br>5.12 wt. % H$_2$SO$_4$ (more broadly 4-6% H$_2$SO$_4$)<br>The lead oxide and H$_2$SO$_4$ convert to sponge lead in formation. | 95 wt. % PbO (more broadly 90-98% PbO)<br>0.076 wt. % plastic fibre (more broadly 0.05-0.1% plastic)<br>4.924 wt. % H$_2$SO$_4$ (more broadly 3-7% H$_2$SO$_4$)<br>The PbO and H$_2$SO$_4$ convert to lead dioxide in formation. |
| Additives to plate material | Nil | 0.25 to 0.5 wt % carbon nanotubes or fullerene, or more generally 0.1-15 wt %. Note VGCF and conductive tin dioxide can be used in place of this at the same levels. |

Many modifications may be made to the embodiments and examples described above without departing from the spirit and scope of the invention.

The claims defining the invention are as follows:

1. An energy storage device comprising:
    at least one negative electrode comprising a mixed electrode comprising:
    a region of a battery electrode material and a region of a capacitor electrode material in an amount of 1% to 15% by weight of the battery electrode material, and
    at least one positive electrode, wherein the positive electrode comprises a positive battery electrode material mixed with a charging ability-increasing additive selected from one or a mixture of:
       (a) carbon nanomaterial, vapour grown carbon fibre, fullerene, or a mixture thereof, and
       (b) tin dioxide conductive materials,
    and wherein the amount of the charging ability-increasing additive in the positive electrode material is between 0.05-10% by weight, based on the total weight of positive electrode material.

2. The energy storage device of claim 1, wherein the amount of the charging ability-increasing additive is between 0.1% and 1.0% by weight.

3. The energy storage device of claim 1, wherein the energy storage device is a lead-acid energy storage device, wherein the negative battery material is sponge lead, and the positive battery material is lead dioxide, and wherein the device further comprises sulphuric acid electrolyte.

4. The energy storage device of claim 3, wherein the positive battery electrode material on the positive electrode is formed from a paste having a paste density of between 4.4 to 4.7 g/cm$^3$.

5. The energy storage device of claim 3, wherein the positive electrode comprises a current collector that is of between 0.8 and 2.2 mm in thickness.

6. The energy storage device of claim 3, wherein the positive battery electrode material comprises an oxygen-suppressing additive.

7. The energy storage device of claim 6, wherein the oxygen-suppressing additive is selected from one or more of the following:
    an oxide, hydroxide or sulfate of antimony,
    an oxide, hydroxide or sulfate of bismuth, and
    an oxide, hydroxide or sulfate of arsenic.

8. The energy storage device of claim 7, wherein the positive battery electrode material is formed from a paste of positive battery electrode material applied to the positive electrode, and wherein the oxygen-suppressing additive includes 100-1000 ppm bismuth.

9. The energy storage device of claim 3, wherein the capacitor electrode material of the negative electrode comprises:
- 5-85 weight % carbon black
- 20-80 weight % activated carbon
- 0-25 weight % carbon material other than carbon black and activated carbon, and
- 0-30 weight % binder.

10. The energy storage device of claim 9, including capacitor additive material in an amount of up to 20 weight % of the capacitor electrode material, the capacitor additive material selected from the group consisting of oxides, hydroxides or sulfates of zinc, cadmium, bismuth, lead and silver.

11. The energy storage device of claim 1, wherein the mixed electrode comprises a current collector with two faces, the region of battery electrode material comprises a layer of battery electrode material covering the faces of the current collector creating two faces of the battery electrode material, and the region of capacitor electrode material is in the form of a layer of capacitor electrode material that overlies both faces of the battery electrode material.

12. The energy storage device of claim 11, wherein the amount of the capacitor electrode material forming the region of capacitor electrode material is from 1% to 7% by weight of the battery electrode material.

13. The energy storage device of claim 1, wherein the device comprises:
- a plurality of said negative electrodes, each of said negative electrode comprising:
- a negative current collector with two faces, with a coating of the negative battery electrode material on the faces of the current collector, wherein the negative battery electrode material comprises:
- 90-95% PbO
- 0.05-0.1% wt. % plastic fibre
- 1-2 wt. % $BaSO_4$
- 0.1-0.6% wt. % organic expander
- 0.5-3 wt. % carbon black
- 4-6 wt. % $H_2SO_4$, in which the PbO and $H_2SO_4$ may be present as sponge lead following formation,
- and a coating of the capacitor material on both faces of the negative battery electrode material at a level of 1-7 wt % based on the amount of negative battery electrode material, the capacitor material comprising:
- 5-85 wt. % carbon black
- 20-80 wt. % activated carbon
- 5-25 wt. % binder, and
- a plurality of said positive electrodes, each of said positive electrodes comprising:
- a positive current collector with two faces, with a coating of a positive capacitor material on the positive current collector, said positive capacitor material comprising:
- 5-85 wt. % carbon black
- 20-80 wt. % activated carbon
- 5-25 wt. % binder, and
- a coating of said positive battery electrode material on both faces of the positive capacitor material, positive the battery electrode material comprising:
- 90-98 wt. % PbO
- 0.05-0.1 wt. % plastic fibre
- 3-7 wt. % $H_2SO_4$, and
- 0.1-10 wt. % of said charging ability-increasing additive,
- in which the PbO and $H_2SO_4$ may be present as lead dioxide following formation, and in which the amount of positive capacitor material on the positive electrode is between 1-6 wt. % based on the positive battery electrode material.

14. The energy storage device of claim 7, wherein the positive battery electrode material is formed from a paste of positive battery electrode material applied to the positive electrode, and wherein the oxygen-suppressing additive includes either or both of the following:
- up to 500 ppm antimony, and
- up to 500 ppm arsenic,
- wherein the ppm levels refer to parts per million based on lead oxide in the paste.

15. The energy storage device of claim 14, wherein the positive battery electrode material is formed from a paste of positive battery electrode material applied to the positive electrode, and wherein the oxygen-suppressing additive includes 100-1000 ppm bismuth.

16. An energy storage device comprising at least one negative electrode and at least one positive electrode, wherein:
- at least one negative electrode is a mixed electrode comprising a mixture of a battery electrode material and a capacitor electrode material, wherein the capacitor electrode material constitutes 2-10% by weight of the mixture of the battery electrode material and the capacitor electrode material,
- each positive electrode comprises a positive battery electrode material mixed with a charging ability-increasing additive selected from one or a mixture of
- (a) carbon nanomaterial, vapour grown carbon fibre, fullerene, or a mixture thereof, and
- (b) tin dioxide conductive materials, and the amount of the charging ability-increasing additive in the positive electrode material is between 0.05-10% by weight, based on the total weight of positive electrode material.

* * * * *